US012774127B2

(12) United States Patent
Kiolbassa

(10) Patent No.: US 12,774,127 B2
(45) Date of Patent: Oct. 27, 2026

(54) ENHANCED ARTICLE-RECEIVING RECEPTACLE AND EMBELLISHMENTS ASSEMBLY

(71) Applicant: Kimberley Kiolbassa, Schertz, TX (US)

(72) Inventor: Kimberley Kiolbassa, Schertz, TX (US)

( * ) Notice: Subject to any disclaimer, the term of this patent is extended or adjusted under 35 U.S.C. 154(b) by 72 days.

(21) Appl. No.: 19/180,902

(22) Filed: Apr. 16, 2025

(65) Prior Publication Data

US 2026/0326969 A1 Oct. 22, 2026

(51) Int. Cl.

| | |
|---|---|
| ***B65D 5/42*** | (2006.01) |
| ***B31B 50/26*** | (2017.01) |
| ***B31B 50/86*** | (2017.01) |
| ***B31B 100/00*** | (2017.01) |
| ***B31B 120/30*** | (2017.01) |
| ***B65D 5/02*** | (2006.01) |
| ***B65D 5/46*** | (2006.01) |

(52) U.S. Cl.

CPC ............ *B65D 5/425* (2013.01); *B31B 50/262* (2017.08); *B31B 50/87* (2017.08); *B65D 5/0254* (2013.01); *B65D 5/46024* (2013.01); *B31B 2100/00* (2017.08); *B31B 2120/302* (2017.08)

(58) Field of Classification Search

CPC ............ B65D 5/46008; B65D 5/46032; B65D 5/46056; B65D 5/6602; B65D 5/425; B65D 5/4233; B65D 5/0227; B65D 5/0236; B65D 5/0254; B65D 33/12; B65D 33/246; B65D 33/18

USPC ...... 229/117, 117.19–117.26, 141, 145, 147, 229/148, 153, 154, 125.22, 125.38, 229/117.05, 117.06, 117.01; 383/26–31, 383/92

See application file for complete search history.

(56) References Cited

U.S. PATENT DOCUMENTS 2,515,327 A * 7/1950 Bergstein ............. B65D 5/6611 229/149
RE24,495 E * 7/1958 Pace .................. B65D 5/46056 229/125.22
4,402,452 A * 9/1983 Kupersmit ............... B65D 5/36 229/160
5,497,876 A * 3/1996 Fleming ............... B65D 5/6602 206/45.28
6,601,757 B2 * 8/2003 Bowman ................ B65D 67/00 229/125.22

(Continued)

FOREIGN PATENT DOCUMENTS

FR 2662141 A1 * 11/1991

*Primary Examiner* — Nathan J Newhouse

(74) *Attorney, Agent, or Firm* — Gray Ice Higdon, PLLC

(57) ABSTRACT

Designs and techniques for creating article-receiving receptacles, including for gifts, are provided and include an article-receiving receptacle formed from a single material that, in a flat, unfolded condition, includes a front panel parallel to a back panel; at least one first side panel parallel to, and in between, the front panel and the back panel; at least one second side panel parallel and adjacent to the front panel or the back panel; at least one first bottom panel portion adjacent to the front panel; at least one second bottom panel portion adjacent to the back panel and parallel to the at least one first bottom panel portion; and at least one top portion adjacent to and parallel to the front panel.

20 Claims, 15 Drawing Sheets

(56) References Cited

U.S. PATENT DOCUMENTS

| | | | | |
|---|---|---|---|---|
| 7,503,456 | B2 * | 3/2009 | Rodriguez | B65D 51/245 206/769 |
| 8,104,670 | B2 * | 1/2012 | Mitchell | B65D 5/4233 206/766 |
| 10,934,056 | B2 * | 3/2021 | Isaac | A47J 47/14 |
| 2005/0023335 | A1 * | 2/2005 | Rasmussen | B65D 63/109 229/160 |
| 2007/0138248 | A1 * | 6/2007 | Wallen | B65D 5/54 229/243 |
| 2017/0057686 | A1 * | 3/2017 | Bagdadi | B65D 5/3621 |
| 2023/0348145 | A1 * | 11/2023 | Kelly | B65D 33/004 |

* cited by examiner

ENHANCED ARTICLE-RECEIVING RECEPTACLE AND EMBELLISHMENTS ASSEMBLY

TECHNICAL FIELD

This disclosure relates to designs and assemblies of article-receiving receptacles, and more particularly to gift packaging for gift presentation to a recipient.

BACKGROUND

A variety of gift packaging exists, but existing gift bags are flimsy and lack a top closure. Existing gift containers require precision and skill to assemble and make attractive, and disassembling gift containers transforms the containers and diminishes them from their original condition, often undermining reusability.

BRIEF DESCRIPTION OF THE DRAWINGS

Referring to FIG. 5B, a sentiment card may have a pull-tab element and a first and/or second side may have ruling, decorative borders, and/or text, however, not limited thereto, and in accordance with one or more embodiments of the present disclosure.

Figure 1:
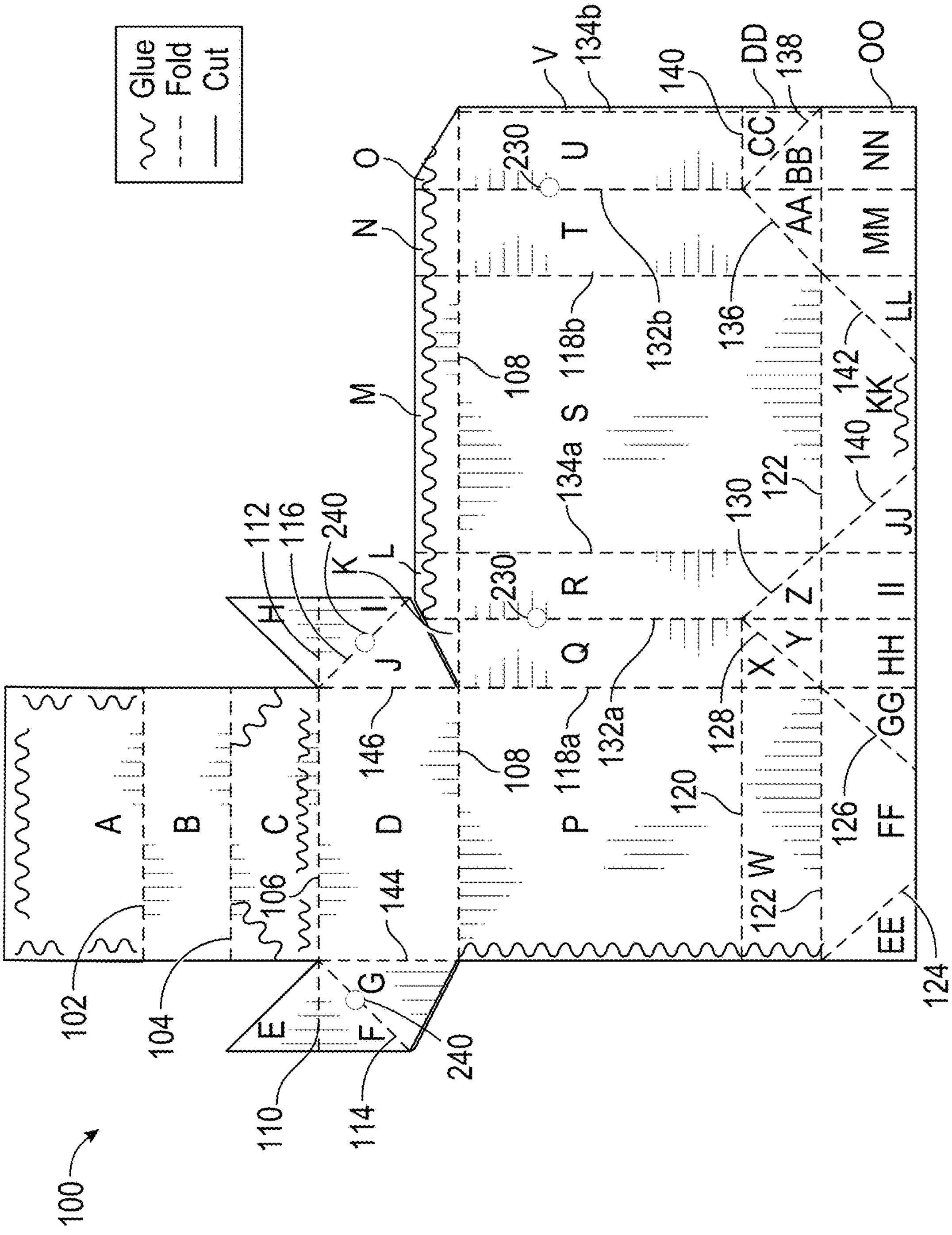
FIG. 1 shows an example single material blank in a flat, unfolded condition, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain designs and assemblies for article-receiving receptacles, such as gift receptacles.

Traditionally, gift articles are willingly presented from one person to another, at no cost, to commemorate an occasion, and typically prepared for presentation by a user inserting gift article(s) into an adorned container. Typically, gift wrapping materials may be purchased and accomplished by one of two popular methods:

1) A tote style paper gift bag, wherein a user may insert gift article(s) through the open end, however, a gift bag typically lacks a top portion closure. A user may attempt to conceal inserted article(s) by placing separate materials e.g. paper, on top of inserted article(s). A separate greeting card/envelope may be purchased and inserted inside the gift bag, however, may go unnoticed by the recipient, and/or may get separated from the gift bag.

2) A container, for example, a box, wherein a user may insert gift article(s) through an open end and enclose with a separate lid. A container may then be skillfully wrapped with a decorative roll of wrapping paper, of which may be conformed and fastened onto a container with adhesive material. The wrapped container may also be adorned with ribbon/bow materials. A separate greeting card/envelope may be purchased and accompany the wrapped gift container. Additionally, a standard greeting card typically provides an interior blank space, wherein a user may handwrite a message to a recipient, however, maintaining straight, neat writing can often be challenging without having linear guidelines.

Ultimately, when preparing gifts for presentation, a user attempts to create a concealed and visually appealing gift presentation, and thus resulting in an exciting sensory experience for a recipient. However, to achieve these tasks, a user may invest an extensive amount of time shopping for and selecting gift presentation materials (container, rolls of wrapping paper, light-weight paper sheets/shred, coordinating embellishments, greeting card/envelope, adhesives, fasteners, scissors, etc.). While paper gift bags may be a quick gift packaging option, this method typically does not fully conceal inserted gift article(s), as the open end of the paper gift bag remains in an open condition. A user may attempt to conceal inserted gift article(s) by covering with paper materials such as, shredded paper strands and/or tissue paper, however, placed paper materials may shift, unintentionally exposing gift article(s). Additionally, paper gift bags may be flimsy, appear ill-prepared and unattractive, and may also create a recipient's perceived reduction of valuation of the enclosed, unopened gift article(s). Contrarily, a gift wrapped container may be fully enclosed and thereby concealing inserted article(s), however, requires more precision and skill in achieving attractive gift wrapping. Further, upon a recipient disassembling either stated form of 'gift wrapped' packaging to reveal gift article(s), the gift packaging transforms and diminishes from its initially received condition, and loses aesthetic appeal and potential for reusability. Additionally, regardless of any variation of gift wrapping' methods, all require various degrees of time, supplies, abilities, expense, and may be tedious and quite laborious, especially during holidays when multiple gift articles require gift presentation preparation. Gift presentation tasks may be daunting, and beyond the creative skillset of some users, and/or pose barriers for some users who may have disabilities, and/or dexterity and/or sight impairments.

A user who is gifting article(s) may benefit from the conveniences of the pre-configured disclosure, as well as a sense of pride and joy of gifting a well-coordinated, visually appealing gift presentation. A recipient may experience sensory elements of anticipation, excitement, and increased value perception, upon receiving a well-coordinated, visually appealing gift presentation. Additionally, a recipient may experience added ease of unveiling and retrieving enclosed article(s), as the disclosure is not intended to fully dismantle (if any at all) during a recipient's interaction with said disclosure, and thereby increasing prone for reusability, and thus more eco-friendly. Therefore, further improvements to existing designs and techniques are desirable and such improvements to existing designs and techniques are certainly achievable. Some attempted solutions have tried to solve deficiencies in gift packaging, however, still have not sufficiently addressed the gaps, and consumers' desired solutions.

The present disclosure provides a single material blank (e.g., paper, cardstock, paperboard, or the like), which may be foldably formed, erected and collapsed, and in an erected condition may provide a top portion (e.g., openable closure) and interior cavity to contain and enclose inserted articles. The interior cavity bottom may have an insert material e.g. foam sheet or any suitable material, to buffer/cushion inserted items. The single material may be provided with one and/or pluralities of carry handle(s), and preconfigured embellishments and/or embellishment arrangements, of which may attach to one and/or pluralities of the disclosure's panels and/or flaps, and an expression card having an interior center panel aperture (window) and pocket portion of which may receive and hold a slidably engaged, sentiment card, of which may be ruled and/or have text, and/or borders, and/or a pull-tab, and wherein, all connect to form an integrated assembly of the present disclosure. Optionally, the disclosure could include a writing device, and/or light emitting devices, and/or sound emitting devices, and/or movement emitting devices, and or scent applications, however, not limited thereto.

An objective of the present disclosure is to provide a preconfigured, convenience-oriented gift packaging of which accomplishes having structural stability and decorative design elements, for a visually appealing and enclosed and concealed gift presentation. As the disclosure, is not intended to dismantle during gift presentation unveiling events, it may be reusable. These and other objects and advantages of the invention are more apparent from the following description and the accompanying drawings.

The present disclosure is the very first preconfigured article receiving receptacle and embellishments assembly, of which solves for the noted inadequacies of current gift packaging. In one embodiment, the present disclosure comprises, a preconfigured assembling having a receptacle of which regardless of varying die-cut dimensions, must be configured with an integral top portion (openable closure), of which primarily encloses and conceals user inserted article(s), and secondarily, provides one and/or pluralities of surfaces of which receive decorative elements and/or coupling components, by way of manufacturing process and/or user self-affixed in accordance with placement indicators and/or receiving (attachment) components. A disclosure may have at least one carry handle, and one and/or pluralities of preconfigured embellishments and/or embellishment arrangements, and an expression card wherein may have a slidably engaged sentiment card, of which may be ruled for writing a neat, personalized message to a recipient. A user may have the option to select and purchase a disclosure that is fully pre-assembled (by way of manufacturing), and/or partially assembled, wherein a user may select and self-affix selected adornments from a coordinating product line. As the disclosure is configured to be reusable, adornments may be interchangeable as desired.

In one or more embodiments, a single material blank may be made of paper, cardstock, paperboard, and/or any suitable materials, having sufficient stiffness to provide in a formed and erected condition, a free standing, article receiving receptacle, and of which during manufacture, may be die-cut into one and/or pluralities of pre-determined dimensions and/or shapes, and may have a pluralities of apertures, incisions, perforations, creases and score lines formed therein, and may have one and/or pluralities of applied colors, textures, patterns, embossing, debossing, etching, coatings, layers, adhesives, graphics, text/characters, and/or relating to a particular theme of the event, (and in any written and/or spoken languages, and including braille), placement indicators, and/or coupling components, and interior and/or exterior. A single material blank may be foldably manipulated to form a front panel, a back panel, a first side panel, a second side panel, a top portion (openable closure), a plurality of top panel flaps, sub-flaps, bottom flaps/panels, of which may be foldably inter-locking and/or adhesively conjoined. As noted, the article-receiving receptacle may be made in varying dimensions and/or shapes, which may also impact the same for any embellishments and/or embellishment arrangements, and/or any coupling components of the disclosure. It is of particular importance to note the designation of said front panel, and back panel and integral top panel, as this may differ from existing collapsible containers.

In one or more embodiments, the graphic material and/or placement indicators, cut-outs, and/or incisions, may be registered in precise position and orientation with respect to any of the crease/fold lines or edges formed in the single material blank, and further ensuring graphic material will be positioned in the desired location on the interior and/or exterior surfaces of a formed an article-receiving receptacle.

In one or more embodiments, a disclosure and/or any coupling components may be pre-configured having one and/or pluralities of any various shapes, sizes, dies-cuts, decorative edging (printed and/or die-cut), colors, graphics, patterns, textures, coatings, text, numerals, characters, photographs, phases/verses, however, not limited thereto, and may relate to a particular theme, and may be in any written and/or spoken language, including braille.

In one or more embodiments, an integral top panel/top flap(s), in a closed condition, may overlap onto and interface an exterior front panel, and first side panel and second side panel. Optionally, a single material blank may be die-cut in varying configurations wherein the top panel/top flap may instead inwardly tuck into the interior of the receptacle and maintain a closed position by way of a front panel tuck-tab inserting into a top panel receiving notch.

Optionally, an integral top panel/top flaps, in a closed condition, may overlap onto an exterior front panel, and first side panel and second side panel, and may be provided with a closure adhesive material, and/or coupling closure components, and/or any suitable materials, to maintain a closed position.

Optionally, a single material may be provided with an applied protective top-coating material in its entirety (interior and/or exterior), and/or in a certain region of a single material (for example, a strip of transparent laminate on the top panel exterior), wherein may aide in the prevention of surface degradation, especially in areas where a user and/or recipient may desire to remove and/or interchange affixed embellishments and/or embellishment arrangements.

Optionally, an article receiving receptacle may be provided with a component of which may be attached to a single material, and wherein may hold and secure in place one and/or pluralities of additional gift items, which may add an extra "surprise" element, for example, a gift card, paper money, lottery card, photos, etc. (e.g., a clip-like component, elastic band, pocket-sleeve, elongated stem having a base on one end, and a card holder on the opposite end, or any suitable component, of which could also have an applied text, and/or characters, and/or graphics).

Optionally, an article-receiving receptacle bottom region may be provided with a bottom insert material for example paperboard, cardboard, foam sheet, Styrofoam, or any suitable material, to buffer/cushion inserted items. The bottom insert material may have slightly smaller dimensions than that of the bottom region, ensuring a snug and suitable fit, and may have one and/or pluralities of applied colors, text, patterns, textures, coatings, and may be inserted and/or inserted and adhered to a receptacle bottom region.

Optionally, the disclosure could include, a writing device and/or light emitting device, and/or sound emitting device, and/or 3-D pop-up material, and/or movement emitting device, and or scent applications, however, not limited thereto.

In one or more embodiments, a disclosure may have embellishments and/or embellishment arrangements, wherein one configuration provides an upright standing, layered embellishments assembly of which may comprise one and/or pluralities of a center core component, wherein may be vertical and elongated, and made of any suitable material and having a first end, a second end, and a distal space in between, of which may receive variations of light-weight embellishments that occupy the distal space. The center core component may be hollow, solid, flexible, non-flexible, smooth, coated, notched, varying dimensions, and/or any combinations thereof. The center core component first end may be constructed in a certain way where it may be slightly larger, and/or have an attached component, preventing embellishments from sliding off thereof. A second end may be provided with an integral, centered bottom base support component having a first side and a second side, wherein a second side may have an affixed peel-away adhesive backing material, for conjoining to a region of an article receiving receptacle.

In one or more embodiments, a plurality of embellishments may be received onto a separate, flat subcomponent, wherein may have a first side and a second side, and pluralities of distally spaced apertures and/or incisions, and of which each may facilitate placement and/or partial insertion of one and/or pluralities of embellishment second ends, that extend radially and outwardly; (Said aperture/incision edges place tension on the partially inserted materials, and aide in maintaining positioning thereof). The flat subcomponent also may have a proximal centered aperture and/or incision, and may be aligned and received onto a center core component first end, and downwardly slid, until interfacing with a second end region, and/or interfacing another embellishment and/or flat subcomponent having affixed embellishments, and repeated, filling the distal space of the center core component. The embellishments conjoined to the center core component may be of same and/or different embellishments, for example, paper materials, balloons, ribbons, stemmed embellishments, or any other suitable embellishments).

In one or more embodiments, embellishments may be preconfigured and vary in sizes, shapes, volume, and materials, in accordance with article receiving receptacle sizes and/or shapes; Embellishments may consist of any lightweight materials and/or components, for example, balloons, die-cut paperboard shapes, text, numbers, stemmed flowers/materials, and/or decoratively dyed and/or printed paper materials, mylar, ribbons, mesh, tulle, net, and/or any suitable materials, and of which may be singular-faced, and/or double-faced, and may have graphics, patterns, coatings, finishes, straight edges and/or decorative edges, wire-edges, filigree, various shapes, sizes, and/or any combinations thereof, and without limitations. Embellishment materials may be of same sizes and/or graduated sizes and/or organized in singular and/or multiple groupings and/or layers. Any suitable materials may vary in thicknesses, however, in any configuration may be beneficial to include some of which may have additional stiffness, to further aide in embellishment arrangement form. Additionally, any suitable, lightweight embellishments may be incorporated into embellishment arrangements and affixed with any suitable methods, materials and/or coupling components.

Optionally, it may be beneficial for singular paper materials to be manufactured and printed with both, solid colors and/or patterns sectionally, and on a first and second side, as this may increase aesthetic appeal, and may slightly reduce embellishment weight, as less paper material may be used in the construction thereof. Again, it is key to keep embellishments lightweight.

Further, embellishment paper materials may be gathered at a proximal center, and the outer edges inwardly folded and interfacing, wherein may form an embellishment having a gathered closed-end condition, and outer edges having an open, expandable condition and may be returned to a collapsed condition.

Paper material closed-ends may be partially inserted into and through the flat subcomponent apertures/incisions. The aperture's/incision's interfacing edges place slight tension on inserted embellishments/paper materials, to maintain placement. This step may be repeated with the same and/or alternating colors/designs of embellishments/paper materials, until each incision is occupied by said paper materials and/or other embellishments, and in a side-by-side manner, and whereby upwardly and/or radially project outwardly thereof.

Some of the embellishments within the embellishment arrangement may be interchangeable however, not intended to unintentionally disengage from a disclosure, as shown, regardless of a receptacle top portion open condition or closed condition, and until a user removes said embellishments and/or embellishment arrangements.

Optionally, embellishments and/or coupling components of the disclosure, by way of manufacturing, may be pre-assembled and/or pre-affixed to an article receiving receptacle.

Optionally, embellishments and/or coupling components of the disclosure, may be assembled by way of manufacturing process, and may be partially affixed and/or included with an article receiving receptacle, wherein a user may self-affixed included components, and in accordance with applied placement indicators and/or receiving (attachment) components.

Optionally, there are limitless possibilities for constructing and/or conjoining embellishments and/or embellishment arrangements, as well as method and materials for affixing to article receiving receptacle surfaces, e.g. adhesively and/or any suitable coupling components may be options, however, in no way limited thereto.

In one or more embodiments, a top portion may receive one and/or a plurality of components for receiving preconfigured embellishments and concealing inserted terminal ends. A top portion could receive integral components wherein, may comprise a bottom base having a vertical stem which may affix from the bottom side of the top portion and pushed upwardly through to the exterior, and met by a coupling component to further secure in place. The vertical stem (male) could receive embellishments of which may have a hollow (female) elongated center core. A top portion could receive one and/or a plurality of components for receiving preconfigured embellishments, for example, lightweight hook and loop material, magnetics, snaps, hooks/loops, nuts, bolts, screws, anchors, tabs, staples, and/or any other suitable coupling components.

Optionally, embellishments could comprise a single layer of embellishments/paper materials directly affixed to a flat subcomponent, eliminating the need for a center core/vertical stem component. The flat subcomponent terminal end may be provided with a peel-away adhesive backing material, wherein a user may remove the said paper cover, exposing the adhesive and further affixing one and/or a plurality of embellishments and/or embellishment arrangements to a receptacle.

Optionally, one and/or pluralities of a receptacle's panels could be configured to receive one and/or a plurality of apertures wherein, preconfigured embellishments could be inserted into and/or pulled upwardly from the interior and through to the exterior of the receptacle's panel(s).

Optionally, embellishments and/or embellishment arrangements could comprise a telescoping-type center core and/or telescoping-type of coupling components (not shown), to allow a user to further adjust said embellishment heights.

In one or more embodiments, an article receiving receptacle may be provided with an affixed expression card of which may be color and/or theme coordinated in accordance with the receptacle assembly. An expression card may have a slidably engaged sentiment card within. An expression card may be made of paperboard, cardstock, and/or any suitable material, and may have a multi-fold configuration, having an interior die-cut aperture (window) of which may be rectangular, oval, or any suitable shape, and may have a pocket portion configured to receive and hold in place at least one sentiment card, of which may be slidably engaged and may have an extending pull-tab on an edge to facilitate grasping and removal thereof. An expression card may have a closure adhesive material and/or closure coupling components, for the expression card to maintain a closed position. In use, the applied ruling on a sentiment card may aid a user in handwriting a neat, linearly organized message to a recipient. Ruling may comprise, applied linear consecutive lines, dashes, dots, microtext, characters, and/or without any limitations thereof. An expression card front panel may downwardly fold and conceal the center panel and sentiment card within, and of which may contain a personalized message written to the recipient by the user. In this configuration of expression card, an envelope is obsolete, thus making another eco-friendly aspect of the present disclosure.

In one or more embodiments, post-celebration, a recipient may remove the personalized sentiment card and retain it as a keepsake and/or use the opposing (ruled) second side to notate a description of the received gift, and/or user's contact information. The noted information may be a convenient reference tool, should the recipient desire to later send a "thank you" card/note to the user.

In one or more embodiments, the graphic material and/or cut-outs may be registered in precise position and orientation with respect to any of the crease/fold lines or edges formed in the die-cut expression card and/or sentiment card and further ensuring graphic material will be positioned in the desired location.

Optionally, an expression card having a sentiment card within, may be manufactured in various predetermined dimensions and/or shapes, wherein may result in variations of orientation, and/or direction of opening, and/or direction of which a sentiment card may be slidably engaged, and placement of an extended pull-tab element and/or cut-out, for facilitating grasping, and/or placement of expression card closure material and/or closure coupling components.

Optionally, any portion of an expression card and/or sentiment card may have applied text, numbers, characters, images however not limited thereto, and of which may be in any written and/or spoken language, including braille, and may be applied on any sides thereof.

Optionally, any component of an expression card may have applied linear ruling of which may be presented in any variation thereof, for example, straight lines, dashes, dots, microtext, characters, and without any limitations.

Optionally, a sentiment card opposing (ruled) second side, could have printed graphics and/or text fields, prompting a gift-giver to populate their contact information, for example, current email, phone number, and/or any other printed fields, of which may be in any written and/or spoken language, including braille.

Optionally, an expression card aperture (window) could have an affixed transparent, protective material sheet, wherein may protect against ink smudging from the sentiment card and may enhance the perception of overall quality of the present disclosure.

Optionally, an expression card interior may have an enclosed light-weight tissue sheet, wherein may protect against ink smudging, and enhance the perception of overall quality of the present disclosure.

Optionally, an expression card front panel could be configured to be interchangeable with cardstock material, of which may have specific printed phrases, e.g. Happy Birthday, Congratulations, etc.

Optionally, an expression card and/or sentiment card could instead be accessible by way of a cut-out of any shape to facilitate grasping thereof.

Optionally, an expression card and/or sentiment card, and/or any component thereof may have one and/or pluralities of straight die-cut edges, and/or one and/or pluralities of decoratively die-cut edges.

Optionally, an expression card could instead be provided with a standard greeting card configuration and eliminate the sentiment card.

Optionally, an expression card and/or sentiment card may be partially or entirely omitted from the disclosure.

In one or more embodiments, one and/or pluralities of article receiving receptacle panels and/or flaps (interior and/or exterior), may have one and/or pluralities of apertures, and in one example, to facilitate carry handle(s), and said apertures may have an applied reinforcement (sealant) material on its edge, and/or affixed reinforcement components e.g. grommets and whereby may aide in preventing receptacle panel separations/tears from carry handle friction and/or weighted stress.

In one or more embodiments, the disclosure may be provided with one and/or pluralities of carry handle(s), and made of any suitable flexible and/or non-flexible materials, hollow and/or solid materials, for example, rope, ribbon strand material, jute, cord, plastic, wood, and any of which may have secondary surface coating materials, and may be fastened to one and/or pluralities of article receiving receptacle panels and/or flaps (interior and/or exterior). Flexible carry handle material may have terminating knotted-end configurations, and/or end-aglet components, and of which may be greater in size and/or shape than inlet apertures, to secure in place and preventing carry handle(s) from unintentionally exiting said inlet apertures.

Optionally, carry handle(s) could provide a means of attaching other various adornments and/or components thereto.

Optionally, one and/or pluralities of carry handle(s) may be omitted from the disclosure, and apertures and/or reinforcement materials/components may remain as optional features of the disclosure.

Optionally, one and/or pluralities of carry handle(s) may be omitted from the disclosure, and further eliminating the need for side panel apertures, reinforcement materials/components.

In one or more embodiments, a disclosure and/or any interchangeable corresponding products may be packaged for retail, for example, by way of an affixed retail hang tag component, and/or placement of product inside of a clear poly bag/sleeve material, and/or cylindrical tube, and/or any suitable materials, of which any may be provided with a paperboard header insert, and wherein may include printed assembly instructions, precautionary statements, and/or QR codes, smart labels, of which user and/or recipient may scan via a smart phone or other device, to access online product website, without limitation thereto.

Optionally, the present disclosure and/or any interchangeable corresponding products may be retailed without packaging.

In one or more embodiments, the exemplary disclosure fully assembled, may be erected, and collapsed and remain in an essentially flat condition for shipping and handling, and yet allowing the disclosure to be easily re-erected.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example single material 100 blank in a flat, unfolded condition, in accordance with one or more example embodiments of the present disclosure.

Referring to FIG. 1, the single material 100 may include panels A, B, C, D, E, F, G, H, I, J, K, L, M, N, O, P, Q, R, S, T, U, V, W, X, Y, Z, AA, BB, CC, DD, EE, FF, GG, HH, II, JJ, KK, LL, MM, NN, and OO, in flat, unfolded positions. An article-receiving receptacle may be formed by creasing the single material 100 using creases 102-146 in the manner described herein. The article-receiving receptacle may be formed by back panel P and back sub-panel W. The back panel P may be attached to a second side panel Q along a vertical crease 118*a*, and to the top panel D along an upper horizontal crease 108, and to the back sub panel W along a lower horizontal crease 122. The back panel P may be folded along crease 120 (when in collapsed condition) and folded along lower horizontal crease 122 and folded along horizontal crease 108 and along crease 118*a*.

The top portion may be formed by A, B, C, D, E, F, G, H, I, and J. Top panel D may be attached along an upper horizontal crease 108, and to C, E, F, G, H, I, and J, and may be folded along crease lines 106, 110, 114, 144, 112, 116, and 146 (to create a top portion openable closure). Further, E may be adhered to the left corner of C, at crease 104, and H may be adhered to right corner of C, at crease 104. B folds inwardly at crease 104, covering and interfacing C, E, and H. Crease 102 aligns and folds to crease 106, and A (interior) cut edge receives adhesive and aligns and interfaces D (interior) crease 108 and adheres to D (interior) crease 108 (creating a top portion openable closure). To fold, (collapse) top portion sub panels, crease and fold 114 between F and G and fold inwardly, and crease 116 between I and J and fold inwardly.

The first bottom flap of the article receiving receptacle may be formed by EE, FF, and GG, and may be attached to the back panel along lower horizontal crease 122, and along vertical crease 118*a*. It may be folded along crease lines 118*a*, 122, 124, and 126.

The second side panel includes interconnected panels or subpanels Q, R, X, Y, and Z. It may be attached to the front panel S along crease 134*a*, to the back panel P along crease 118*a*, and to the bottom left side along lower horizontal crease 122, and to the side panel top flaps K, and L, along horizontal crease 108, and front panel top flap M, along horizontal crease 108. It may be folded along crease lines 132*a*, 120, 128, and 130 (when in collapsed condition) and along crease line 108, and along crease line 122 (creating a closed bottom).

The second side panel bottom flap, HH and II, may be attached to GG along crease 118*a*, and JJ along crease 134*a*, and along lower horizontal crease 122. It folds along lower horizontal crease 122 (creating a closed bottom) and is bisected by vertical crease 132*a*.

The front panel of the article receiving receptacle may be formed by panel S, and may be attached to a second side panel along crease 134*a*, to the first side panel along crease 118*b*, to the front panel top flap along crease 108, and to the second bottom flap along crease 122, and may fold along crease line 122, along crease line 108 (when package is closed), and along creases 134*a* and 118*b*.

The second bottom flap of an article receiving receptacle may be formed by JJ, KK, and LL, and may be attached to the front panel S along lower horizontal crease 122, and along vertical crease 118*b* and 134*a*. It may be folded along crease lines 118*b*, 134*a*, 122, 140, and 142 (creating a closed bottom). KK cut edge may receive adhesive and adhere to FF cut edge, and/or FF cut edge may receive adhesive and adhere to KK cut edge, while keeping rectangular dimensions of closed bottom region.

The first side panel includes interconnected panels or subpanels T, U, AA, BB, and CC. It may be attached to the front panel S along vertical crease 118*b*, and along horizontal crease 122, and to the front panel top flap M, and first side panel top flaps N, and 0, along horizontal crease 108. It folds along crease lines 132*b*, 136, 138, and 140 (when in collapsed condition) and along crease line 108, and along crease line 122, and along crease 134*b* (to attach first side panel to back panel cut edge). It folds along lower horizontal crease 122 (creating a closed bottom) and is bisected by vertical crease 132*b*.

The first side flap includes V, DD, and OO. It may be attached to the first side panel and the first side panel bottom flap along crease 134*b*. It folds along crease 134*b* and bonds to adhesive applied on the back panel P (interior) cut edge and indicated glue region. The article receiving receptacle as described provides a structure for enclosing and concealing gift articles.

Optionally, a bottom region (interior) may receive an inserted and/or affixed bottom material (not shown), for added buffering/cushioning of inserted articles, for example, paperboard, corrugated cardboard, foam sheet, Styrofoam, or any suitable material of which could have one and/or pluralities of applied colors, patterns, textures, coatings, however not limited thereto.

Optionally, a single material blank (tuck tab, inter-locking bottom) sideway collapsing structure, wherein a tuck tab inserts into a notch to enclose the structure, may be formed from the alternate die-cut single material blank 700 made of materials having sufficient stiffness to provide a free standing, upright receptacle having a top portion openable closure, and having foldably formed hinges, and panels and endmost panels (front panel flap edge, and a first side panel edge) are adhered together, as a front panel flap edge and receives an adhesive material, of which binds together with a first side panel edge, and defining a center, hollow space, and a top portion, and a bottom-locking end. Flaps are hinged to the bottom edges of a front panel, a back panel, and a first side panel, and a second side panel, to form a bottom-locking end closure, and wherein flaps may have applied adhesive material. A front panel having a proximally centered tuck-tab closure, a back panel has an integral top portion and provides a locking notch approximate center of the receptacle's top portion edge, of which receives insertion of a front panel's centered tuck-tab closure, and creating an interlocking, top end closure of a receptacle. A bottom-locking panel, having hinged locking flaps whereby each closure flap, assumes an overlapping, interlocking condition which resists tendency of the closure flaps, to separate or fold inwardly from their overlying condition, and holds a receptacle in an erect condition. All of the panels being interconnected, may be erected from a collapsed condition, and formed into a three-dimensional receptacle, and having a center cavity space to receive, enclose and conceal inserted articles. A first side panel and a second side panel may each have an aperture of which, the aperture edges may have an applied reinforcement sealant material, and/or installed reinforcement components, of which a carry handle(s) may be inserted into and through.

In one or more embodiments apertures 230 may be formed through the sides (e.g., panels T and U, and panels Q and R). Apertures 240 may be formed through the sides of the top portion 220 (e.g., through panels F and G, and through panels J and I).

Figure 2A:
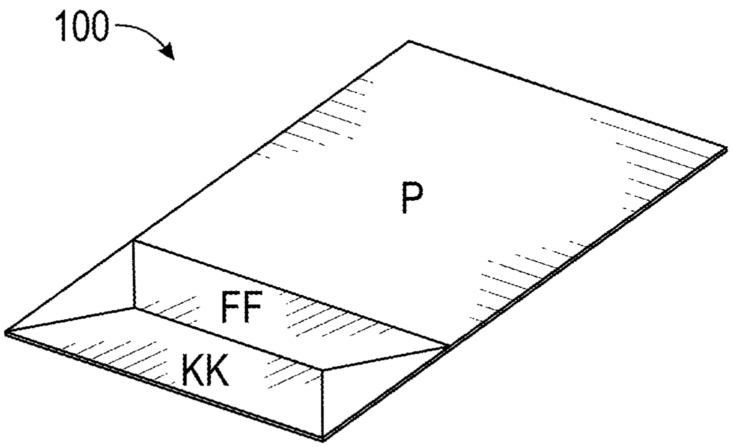
FIG. 2A shows an example of the single material after applying the folds of FIG. 1, in accordance with one or more embodiments of the present disclosure.

FIG. 2A shows an example of the single material 100 after applying the folds of FIG. 1, in accordance with one or more embodiments of the present disclosure.

Referring to FIG. 2A, the panel P is shown along with panels FF and KK, forming a bottom portion. The single material 100 is still flat in FIG. 2A.

Figure 2B:
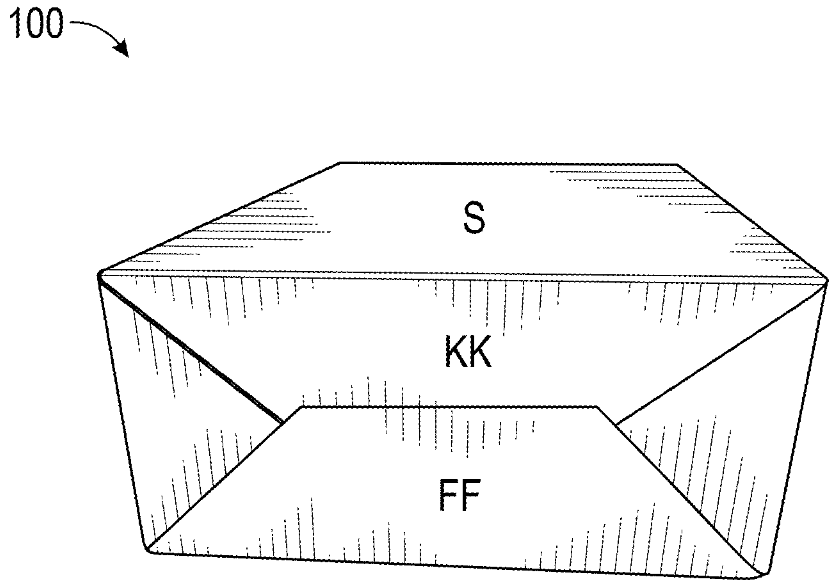
FIG. 2B shows an example of the single material of FIG. 2 forming a receptacle, in accordance with one or more embodiments of the present disclosure.

FIG. 2B shows an example of the single material 100 of FIG. 2 forming a receptacle, in accordance with one or more embodiments of the present disclosure.

Referring to FIG. 2B, the single material 100 that is flat in FIG. 2A may be opened to form a receptacle whose bottom portion is formed with panels EE, FF, GG, JJ, KK, and LL.

Figure 2C:
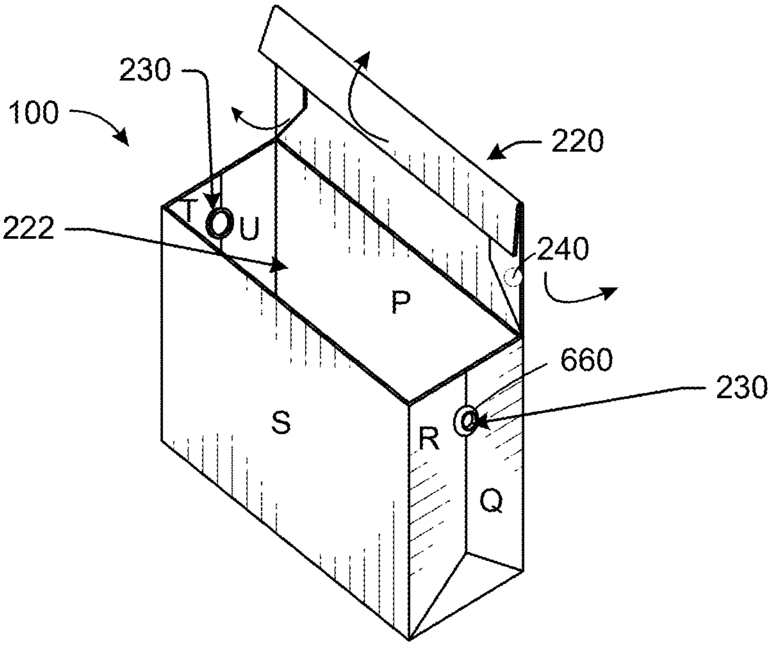
FIG. 2C shows a perspective view of the single material of FIG. 2B in an upright position, in accordance with one or more embodiments of the present disclosure.

FIG. 2C shows a perspective view of the single material 100 of FIG. 2B in an upright position, in accordance with one or more embodiments of the present disclosure.

Referring to FIG. 2C, the panel S is a front panel, with panels T and U as a bisected first side panel, and V as a first side flap, and (a bisected second side panel Q and R, are on the opposite side, and in between panel S, and panel P as a back panel. A top portion 220 is formed by panels A, B, C, D, E, F, G, H, I, and J, and is shown in an open position so that a receptacle 222 is formed by the panels P, S, Q, R, T, and U. Panels A, B, C, D, E, F, G, H, I, and J, may open to form the top portion 220 as further shown in FIG. 2D.

Figure 2D:
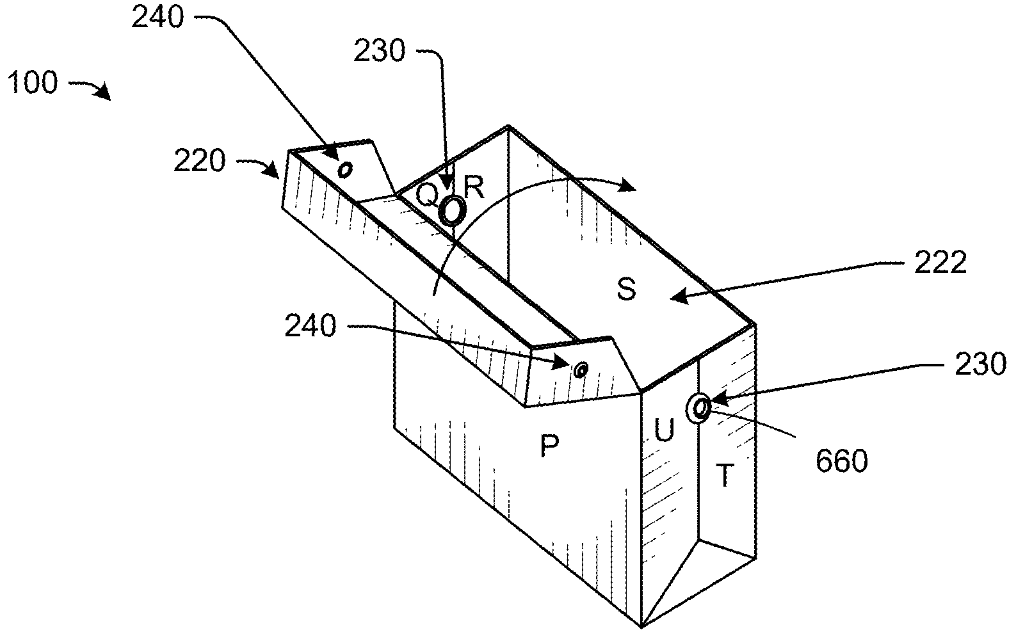
FIG. 2D shows a perspective view of the single material of FIG. 2C with the top portion formed and open, in accordance with one or more embodiments of the present disclosure.

FIG. 2D shows a perspective view of the single material 100 of FIG. 2C with the top portion 220 formed and open, in accordance with one or more embodiments of the present disclosure.

Figure 2E:
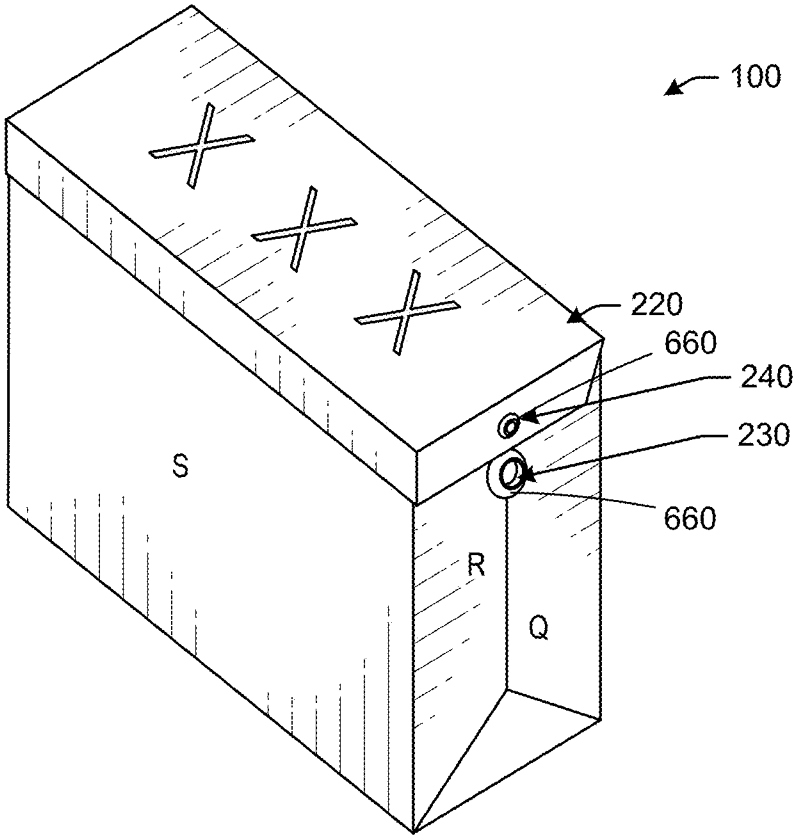
FIG. 2E shows a perspective view of the single material of FIG. 2C with the top portion formed and closed, in accordance with one or more embodiments of the present disclosure.

The top portion 220 may close, as further shown in FIG. 2E.

FIG. 2E shows a perspective view of the single material 100 of FIG. 2C with the top portion 220 formed and closed, in accordance with one or more embodiments of the present disclosure.

Referring to FIG. 2E, the "Xs" on the top portion 220 may include adhesive materials, and/or apertures/incisions, and/or fastener components, to which one and/or pluralities of varying embellishments 408, and/or embellishment arrangements 400, may be attached to the top portion 220 as shown in further embodiments herein. The "Xs" may refer to placement indicators which may guide a user in self-affixing said embellishments 408 and/or embellishment arrangements 400. The placement indicators may vary in location and quantity depending on dimensions, size, and shape of an article receiving receptacle formed by the single material 100. Ultimately, upon placement of embellishments 408 and/or embellishment arrangements 400, its decorative open ends project upwardly and radially outward thereof, in a visually appealing and well-balanced manner.

Referring to FIGS. 2C-2E, apertures 230 may be formed through the sides (e.g., panels T and U, and panels Q and R) to allow for attachment of a carry handle 302 portion as shown in further embodiments herein. The apertures 230 and 240 may include an applied reinforcement sealant material (not shown), and/or installed reinforcement components 660.

Referring to FIGS. 2D and 2E, additional apertures 240 may be formed through the sides of the top portion 220 (e.g., through panels F and G, and through panels J and I) to allow for attachment of a carry handle 302 portion as shown in further embodiments herein.

Figure 3A:
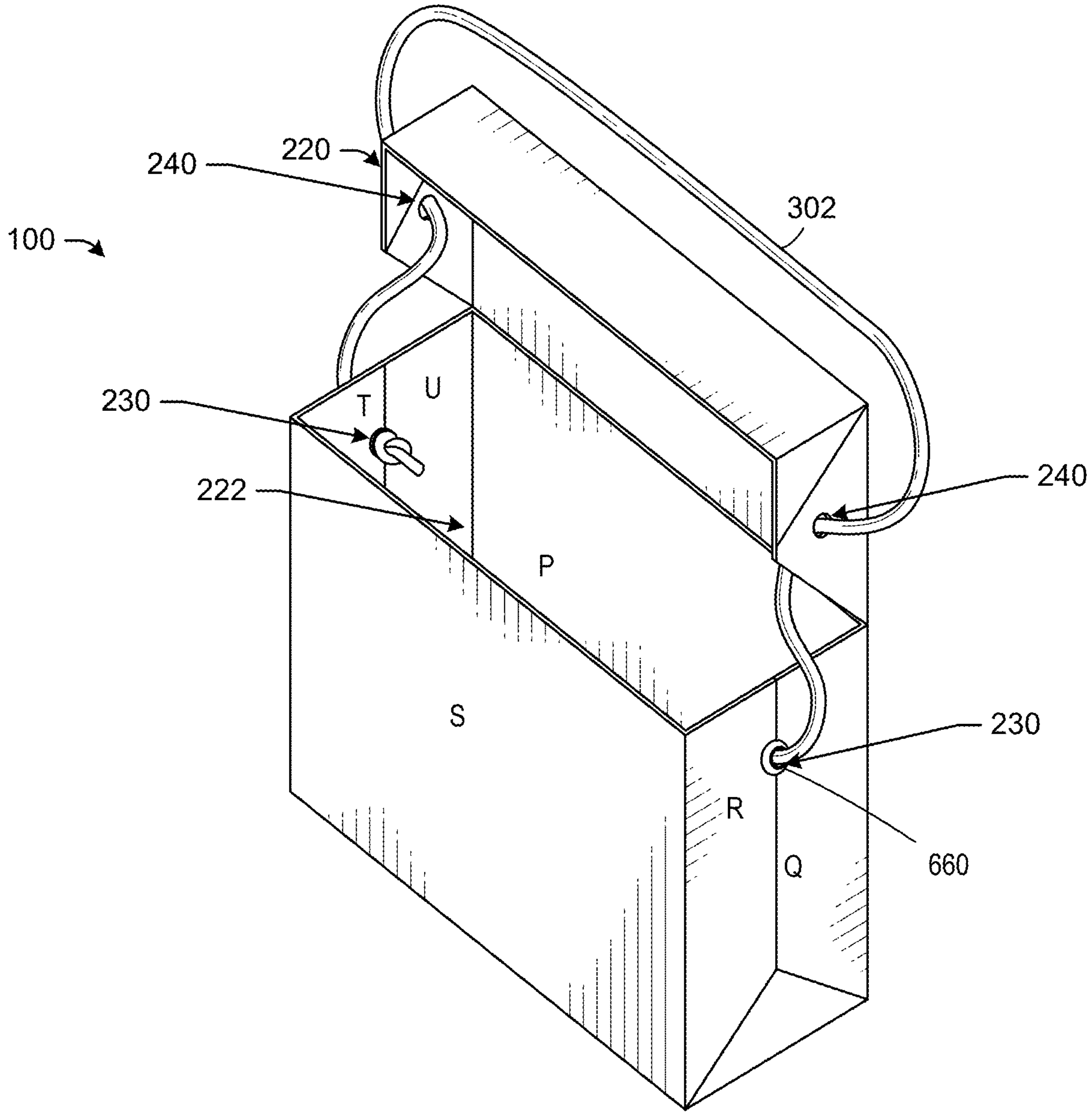
FIG. 3A shows the perspective view of the single material of FIG. 2D with a carry handle added, in accordance with one or more embodiments of the present disclosure.

FIG. 3A shows the perspective view of the single material 100 of FIG. 2D with a carry handle 302 added, in accordance with one or more embodiments of the present disclosure.

Referring to FIG. 3A, a carry handle 302 is attached to the single material 100 via the apertures 230 and 240 (e.g., weaving the carry handle 302 through the apertures). When the carry handle 302 is a rope, string, or similar material, the carry handle 302 may be attached to the single material 100 by tying a knot at each end as shown in FIG. 3A, so that the ends of the carry handle 302 cannot be pulled through the apertures 230, 240.

The apertures 230 and 240 may include an applied reinforcement sealant material (not shown), and/or installed reinforcement components 660, of which carry handle 302 may be inserted into and through.

A carry handle 302 may be a rope, string, ribbon, tubular mesh, cord, or similar material, and may comprise, flexible and/or non-flexible materials, and may be of one and/or pluralities of any colors, and/or patterns, and/or textures, and varying lengths, widths, thicknesses, and shapes, and/or may be enclosed by a secondary covering material (not shown). A carry handle 302 may have a first end, and a second end, and distal region in between said first end, and second end, and may have terminating knotted-end configuration, and/or component e.g. end-aglet (not shown). It may be desirable that carry handle 302 have sufficient length to extend beyond an expanded receptacle formed by the single material 100 and affixed embellishments 408, and/or embellishment arrangement(s) 400. A carry handle 302 first end may be threadedly inserted into a first side panel (e.g., via side panel formed by T and U), just enough where said carry handle 302 first end may receive a terminating knotted-end, and/or have an affixed end-aglet (not shown), and pulled slightly taught against the first side panel (interior), and a carry handle 302 second end may be threadedly inserted into a first top portion sub-flap (interior) aperture (e.g., formed by panels E, F, G), and pulled and extended above the affixed embellishments 408, and/or embellishment arrangement(s) 400, and a carry handle 302 second end may be threadedly inserted into a second top portion sub-flap aperture (exterior) (e.g., formed by panels H, I, J), and then threadedly inserted into a second side panel aperture (exterior) (e.g., formed by panels Q and R), just enough where said carry handle 302 second end may receive a terminating knotted-end, and/or have an affixed end-aglet (not shown), and pulled slightly taught with the second side panel (interior).

Optionally, said carry handle(s) 302 first end and second end could be fastened to a first side panel (e.g., formed by panels T and U) and a second side panel (e.g., formed by panels Q and R) respectively, by way of adhesive material (not shown) and/or any other suitable fastening material and/or coupling component (not shown). It should be readily understood by one of ordinary skill in the art that a carry handle 302 may be made of any materials and a carry handle 302 may be attached to a receptacle structure formed by a single material 100 in other manners, and such would be within the scope of the present disclosure.

Optionally, the present disclosure could have pluralities of carry handles 302.

Optionally, one and/or a plurality of carry handle(s) 302 could be omitted from the present disclosure altogether.

Figure 3B:
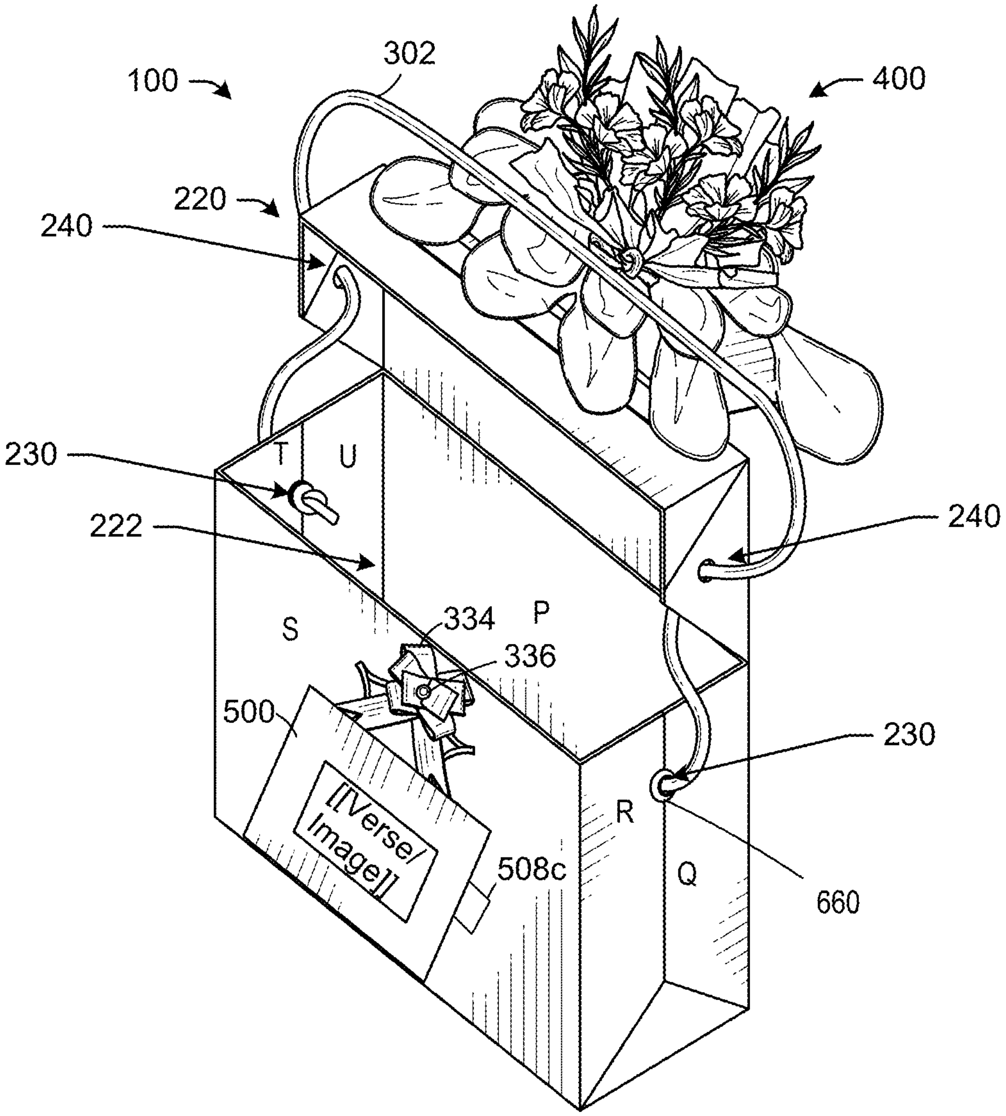
FIG. 3B shows the perspective view of the single material 100 of FIG. 3A with embellishments 408, and/or embellishment arrangement(s) 400, and/or embellishments 334 attached, in accordance with one or more embodiments of the present disclosure.

FIG. 3B shows the perspective view of the single material 100 of FIG. 3A with embellishments 408, and/or embellishment arrangement(s) 400, and/or embellishments 334 attached, in accordance with one or more embodiments of the present disclosure.

Referring to FIG. 3B, one or more embellishments 408, and/or embellishment arrangement(s) 400 are added by attaching to a top portion 220, in accordance with placement indicators as described above. In addition, embellishment 334 may include a grouping of ribbons, and/or any other suitable adornments, and attachable to panel S via any adhesive material and/or fastener component.

Referring to FIG. 3B, in one or more embodiments, an expression card 500 having multiple panels and a slidably engaged sentiment card 508 within, may be attached to panel S via an adhesive and/or fastener component.

In one or more embodiments, an expression card 500 may have a closure adhesive material (not shown) and/or closure coupling component(s) (not shown), e.g. magnets, snaps, buttons, hook and loop material, however, not limited thereto, for an expression card 500 front panel 506 and center panel 504, to maintain a closed position.

In one or more embodiments, an expression card 500 and/or any of its components, may comprise, any one and/or pluralities of paperboard, cardstock, and/or any suitable material, and comprise one and/or pluralities of colors, dimensions, sizes, patterns, fonts, ruling, images, coatings, finishes, textures, photographs, text, symbols, characters, numerals, phrases, etching, debossing, embossing, die-cuts, attachments, graphics, pop-ups, three-dimensional objects, shapes, words, verses, etc., and of which may be expressed in any written and/or spoken languages (including braille), and any without any limitations thereto.

In one or more embodiments, the expression card 500 and/or sentiment card 508 may be configured to coordinate with the color/theme of the article receiving receptacle 222.

In one or more embodiments, the expression card 500 may have in one variation, a multiple panel fold configuration, and having an interior center panel aperture (window) 504*c*, of which the aperture may be rectangular, oval, or any suitable shape, and wherein may hold in place and partially display a first side of a slidably engaged sentiment card 508.

In one or more embodiments, the expression card 500 and back panel flaps 502*c* and 502*d*, wherein form back panel 502 pocket portions, of which may receive and hold a separate die-cut and ruled sentiment card 508 within, and the expression card 500 may be attached to the single material 100, panel S, as shown in FIG. 3B.

In one or more embodiments, the sentiment card 508 may have an extending pull-tab 508*c* on its edge to facilitate grasping and removal thereof.

In one or more embodiments, the sentiment card 508 first side and/or a second side may have applied ruling 508*d*, of which may aide a user in handwriting a neat, linearly organized message to a recipient, and ruling may comprise, for example, a plurality of applied consecutive lines, dashes, dots, microtext, characters, however, not limited thereto. In this configuration of the expression card 500, an envelope is obsolete, thus making another eco-friendly aspect of the present disclosure.

In one or more embodiments, the front panel 506*b* of the expression card 500 may downwardly fold over the center panel aperture (window) 504*c*, of which contains the sentiment card 508 within. The downwardly folded back panel 502 conceals the personalized message written on the sentiment card, by the user.

In one or more embodiments, said expression card 500 having a sentiment card 508 within, may have a closure adhesive material and/or closure coupling components, e.g. magnets, snaps, buttons, hook and loop, however, not limited thereto, for maintaining a closed position.

Further, the expression card 500 may comprise, a front panel 506 having a first side 506*a*, and second side 506*b*, a center panel 504 having a first side 504*a* and second side 504*b*, and of which may have an aperture further defining a window, and a back panel 502 having a first side 502*a* and second side 502*b*, and wherein a first side 502*a* may have back panel flaps 502*c* and 502*d* (pocket portions). The expression card 500 made of paperboard, cardstock, and/or any other suitable material, and having a plurality of crease lines wherein upon bending and creasing, foldably forms a multiple panel expression card 500, and of which may have presentation of either landscape mode and/or portrait mode, and an expression card 500 and/or a sentiment card 508 edges may be straight cut and/or decoratively cut, and/or shapes, and/or applied materials. Further, an expression card 500 front panel first side 506*a* and front panel second side 506*b* may share a same, first edge 506*d*, second edge 506*e*, third edge 506*f*, and fourth edge 506*g*, and may be creased for bending and folding and connected to a center panel second edge 504*f*. A center panel 504 of the expression card 500 may have a center panel aperture (window) 504*c*, and share a same, first edge 504*e*, second edge 504*f*, and third edge 504*g*, and a fourth edge 504*h*, and may be creased for bending and folding, and connected to the back panel fourth edge 502*k*. Optionally, a said center panel second side 504*b*, could have a transparent protective film over the center panel aperture 504*c* (window), of which would be adhered to a center panel second side 504*b*, first edge 504*e*, second edge 504*f*, third edge 504*g*, and fourth edge 504*h*. A front panel second side 506*b*, may be folded downwardly and interface said center panel first side 504*a*, and wherein the front panel second edge 506*e*, aligns with center panel fourth edge 504*h*. Back panel pocket portion flaps 502*c* and 502*d*, are each folded inwardly and interface the back panel first side 502*a*, at first edge 502*h* and second edge 502*i*. The center panel 504*b*, receives adhesive on first edge 504*e* and second edge 504*f*, to bind together with the folded back panel pocket portion flaps 502*c* and 502*d*, and the center panel third edge 504*g*, remains open and wherein a sentiment card 508 may slidably engage.

The expression card 500, back panel second side 502*b*, may receive adhesive and/or fastener component(s), to affix to a receptacle structure 222 front panel S.

Optionally, a center panel first side 504*a*, third edge 504*g*, could receive a thumb notch (not shown) proximal center, to allow grasping and removal of a slidably engaged sentiment card 508, instead of having a pull-tab 508*c*.

Optionally, the expression card 500 may have card closure materials and/or components (not shown), wherein temporarily releasably engage one another to hold the expression card 500 front panel 506 and center panel 504, in a closed position. This would conceal the sentiment card 508, having a user's personalized, written message until the recipient interacts with the gift presentation.

Optionally, closure component(s) may be defined as adhesives, magnetics, ribbons, loops, hooks, snaps, etc., and/or any combination/variation thereof, and without limitation thereof.

Optionally, recordable medium allowing users to record songs, sounds, or spoken words may be an additional component of the expression card 500. In this manner, the expression card 500 may include one or more devices with memory, processing circuitry, and output displays (e.g., digital displays for digital text and/or images, and/or speakers for audio output), however, without limitations thereto.

Optionally, in use a sentiment card second side 508*b*, may be utilized by either user and/or a recipient. A user could be prompted by printed text to notate their contact information (email, phone, address), which may be beneficial to a recipient, should they desire to send a post-event appreciation/thank you cards, and/or simply update their contact records with a user's current information for use at a later date, such as sending the user a birthday card, holiday card, etc. Additionally, a recipient may further utilize any remaining sentiment card 508 blank space for notating a description of received gift article(s), from the user, wherein may later be helpful in specifically referencing gifted articles, if/when writing post-event appreciation/thank you cards. This feature may prove especially helpful where multiple other gift presentations to a recipient occur, such as a baby shower, wedding, etc.

Figure 3C:
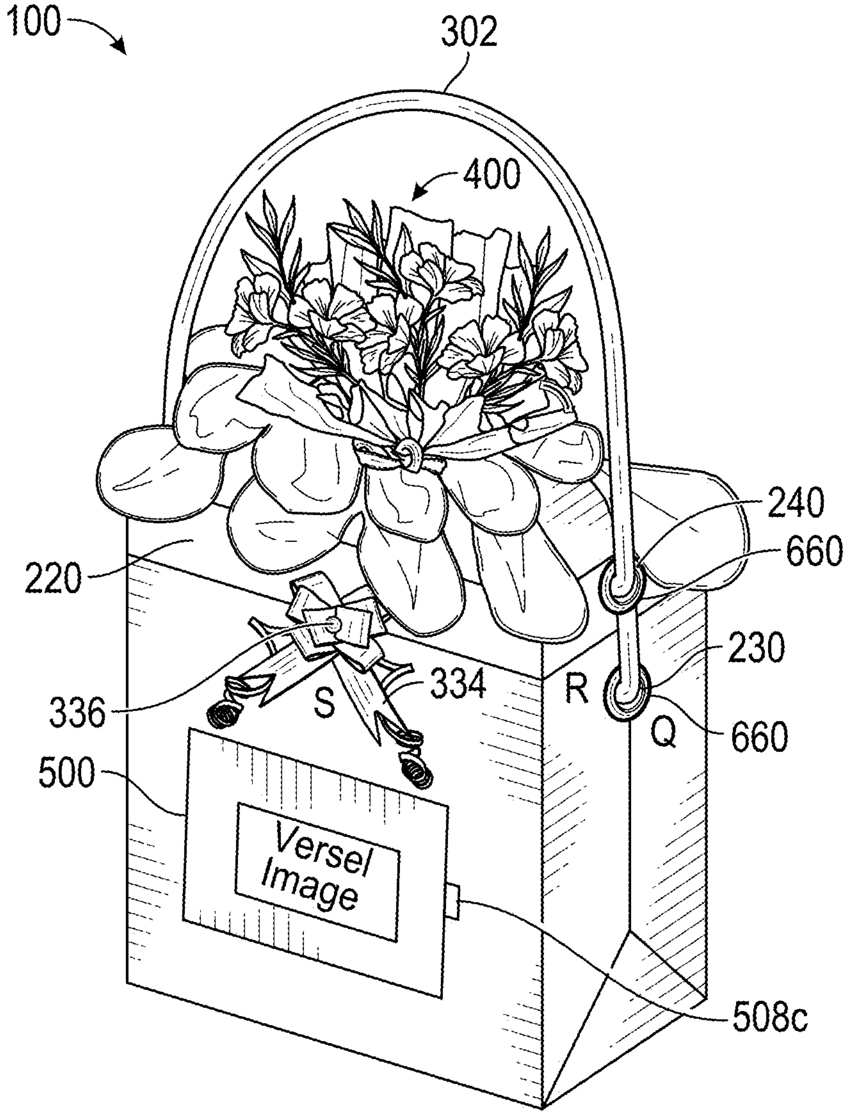
FIG. 3C shows the perspective view of the single material of FIG. 3B in a closed orientation, in accordance with one or more embodiments of the present disclosure.

FIG. 3C shows the perspective view of the single material 100 of FIG. 3B in a closed orientation, in accordance with one or more embodiments of the present disclosure.

Figure 4A:
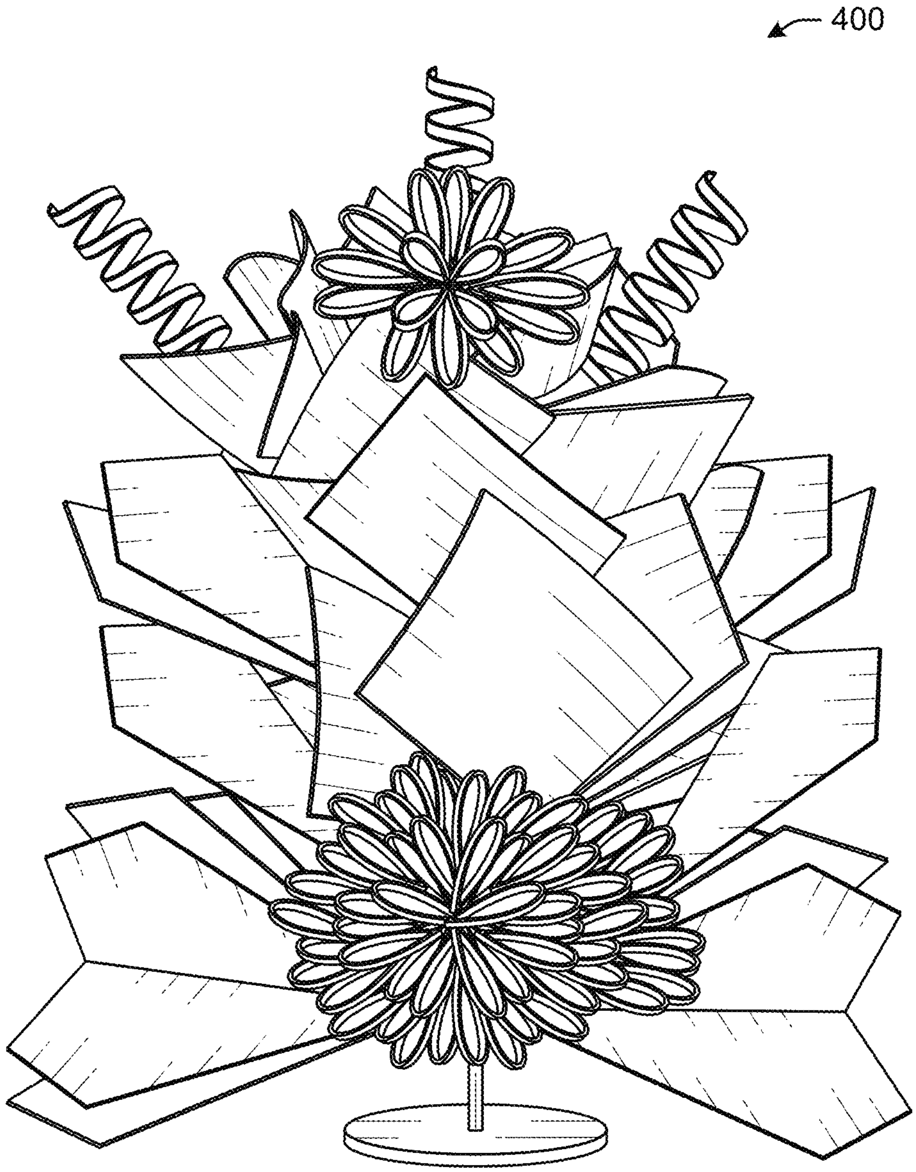
FIG. 4A shows an example embellishment arrangement attachable to the single material of FIG. 3B, in accordance with one or more embodiments of the present disclosure.

FIG. 4A shows an example embellishment 400 attachable to the single material 100 of FIG. 3B, in accordance with one or more embodiments of the present disclosure.

Figure 4B:
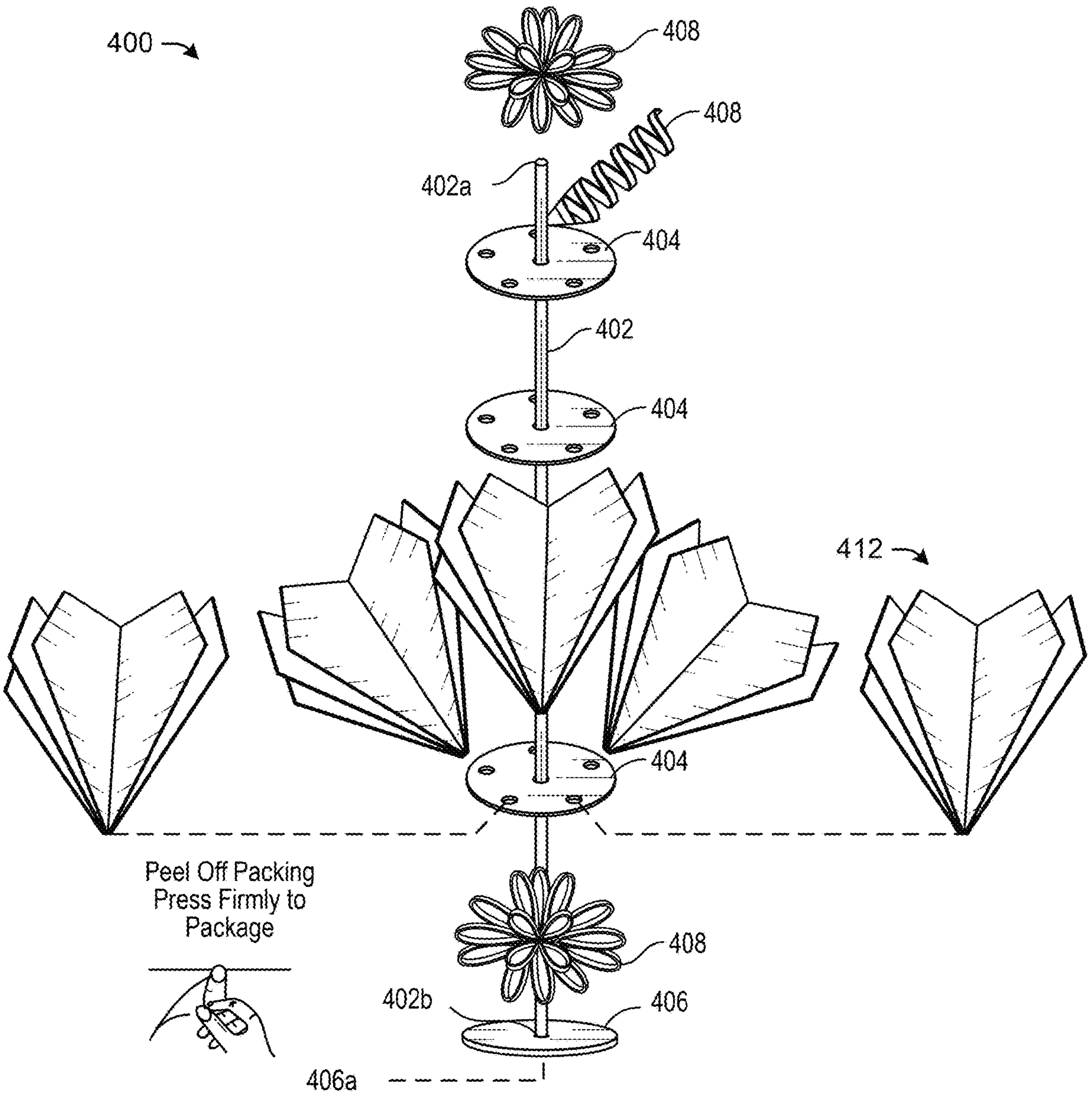
FIG. 4B shows an exploded view of the embellishment arrangement configuration of FIG. 4A, in accordance with one or more embodiments of the present disclosure.

FIG. 4B shows an exploded view of an embellishment arrangement 400 of FIG. 4A, in accordance with one or more embodiments of the present disclosure.

The embellishment arrangement 400 is an example adornment, and of which may be and may include ribbon materials, and/or stemmed décor, mesh, tule, and/or thin decorative materials, however not limited thereto, which may attach to flat subcomponents 404 of which are attached to a center core component 402, which may attach to a bottom base support 406 having a peel-away adhesive/paper-backing material 406*a*, and affixing onto a receptacle surface. The center core component 402 may be elongated (e.g., extending between a first end 402*a* and a second end 402*b*) and made of flexible and/or rigid materials.

The embellishment arrangement 400 may include flat subcomponents 404 (e.g., made of cardstock, paperboard, plastic, etc.) through which the center core component 402 may extend. The embellishment arrangement 400 may include embellishments 408 and/or paper or mesh materials 412.

Figure 4C:
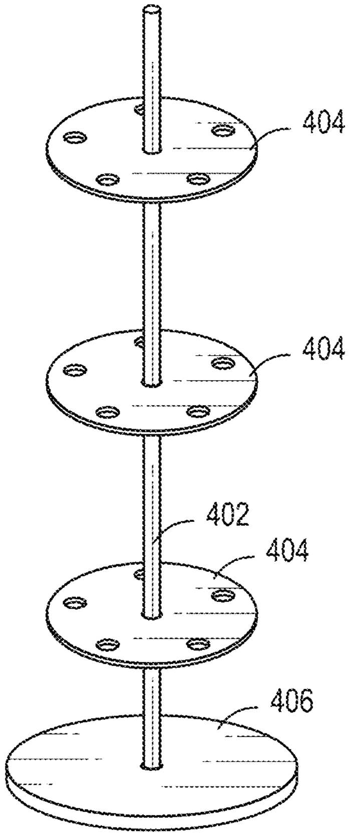
FIG. 4C shows the center core component with flat subcomponents of FIG. 4B, in accordance with one or more embodiments of the present disclosure.

FIG. 4C shows the center core component 402 with flat subcomponents 404 of FIG. 4B, in accordance with one or more embodiments of the present disclosure.

Figure 4D:
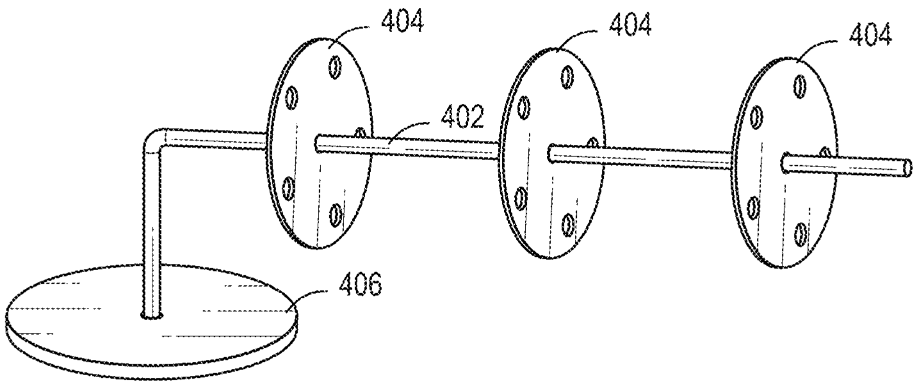
FIG. 4D shows the center core component with flat subcomponents of FIG. 4C in a bent position, in accordance with one or more embodiments of the present disclosure.

FIG. 4D shows the center core component 402 with flat subcomponents 404 of FIG. 4C in a bent position, in accordance with one or more embodiments of the present disclosure. As shown in FIG. 4D, the center core component 402 may be flexible and may bend.

Figure 5A:
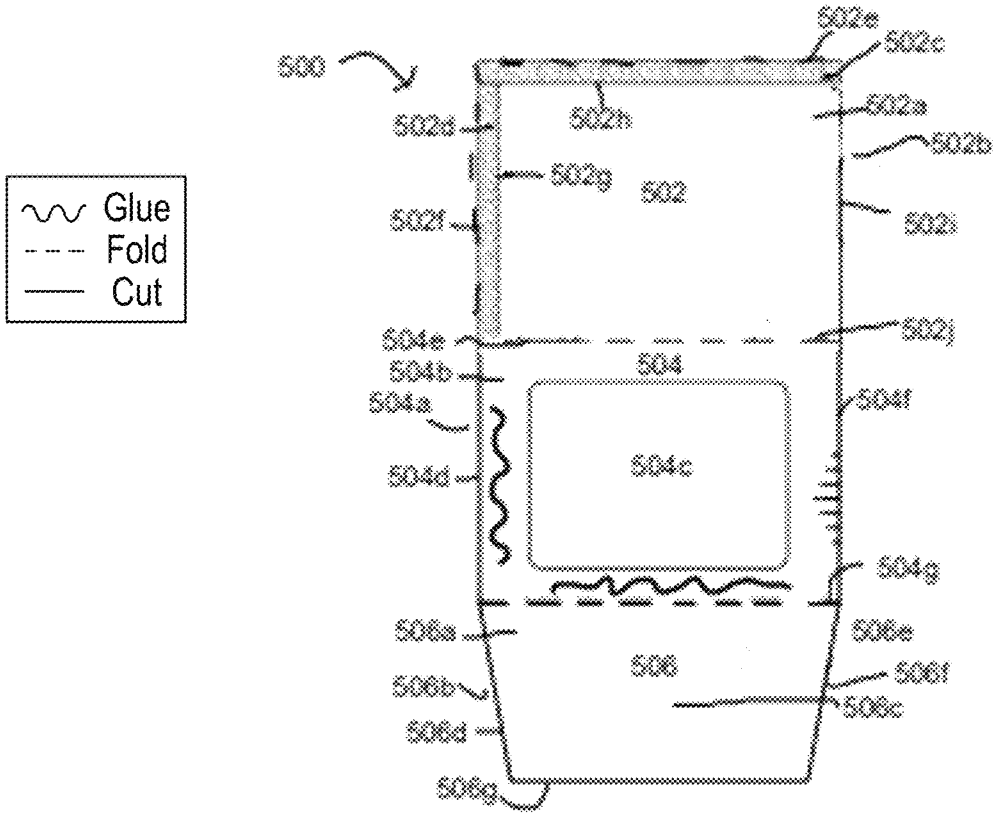
FIG. 5A shows a view of an example expression card, which may have multiple panels, in accordance with one or more embodiments of the present disclosure.

FIG. 5A shows a view of an example expression card 500 (unfolded).

Figure 5B:
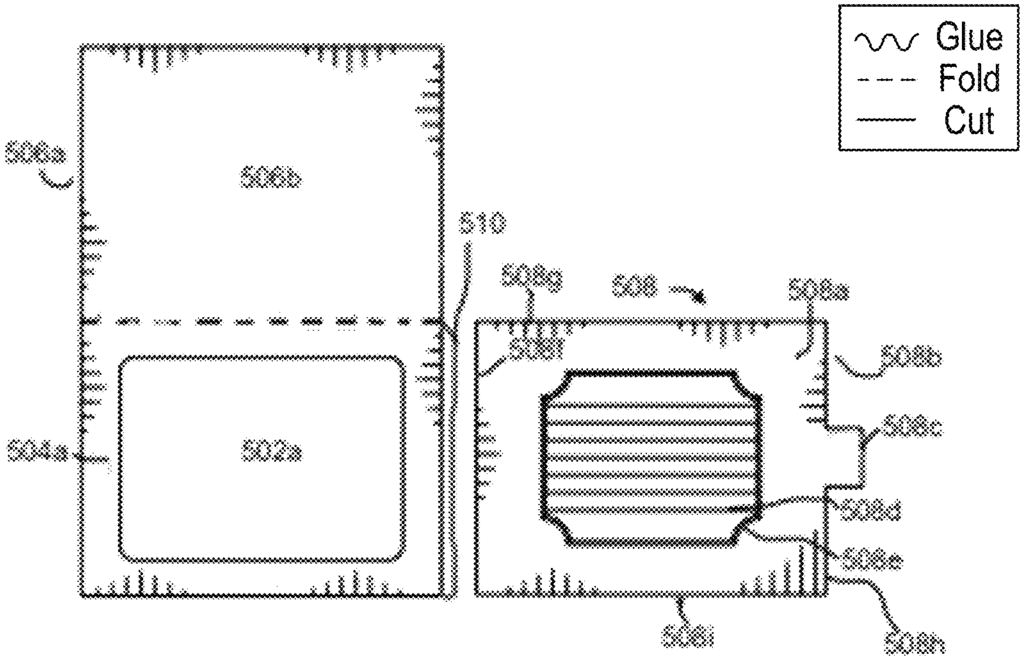
FIG. 5B shows the example expression card of FIG. 5A folded and a sentiment card separated from the expression card center panel pocket region, in accordance with one or more embodiments of the present disclosure.

FIG. 5B shows a view of an expression card 500 after applying folds of FIG. 5A, and a sentiment card 508 wherein may have a pull-tab 508*c* element; A sentiment card 508 separated from the expression card 500 and center panel 504, in accordance with one or more embodiments of the present disclosure.

An engaged sentiment card 508 second side 508*b*, interfaces an expression card 500 back panel 502*a*, having a first and second back flaps 502*c* and 502*d* (pocket portions) formed by creases. A pull tab 508*c* element may extend on a first edge 508*f* of the sentiment card 508, which facilitates removal and separation from said expression card 500 of which may be formed by a center panel 504 and a back panel 502 as described above.

Figure 6A:
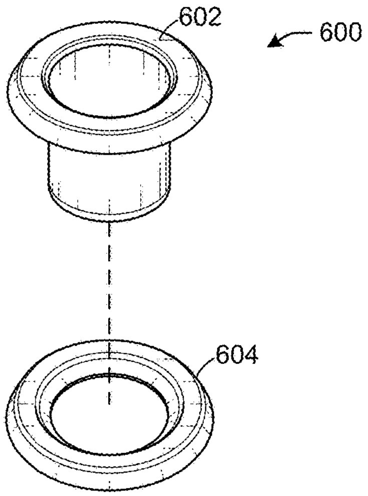
FIGS. 6A, 6B, 6C each show an example component of which may reinforce one and/or pluralities of apertures on the single material, and as shown in FIG. 3A, in accordance with one or more embodiments of the present disclosure.

FIG. 6A shows an example component 600 for reinforcement of apertures for a carry handle 302 to be inserted into and through, in accordance with one or more embodiments of the present disclosure.

The component 600 may include a first portion 602 that fits into a second portion 604, each of which may fit into apertures 230 and 240, for example.

Figure 6B:
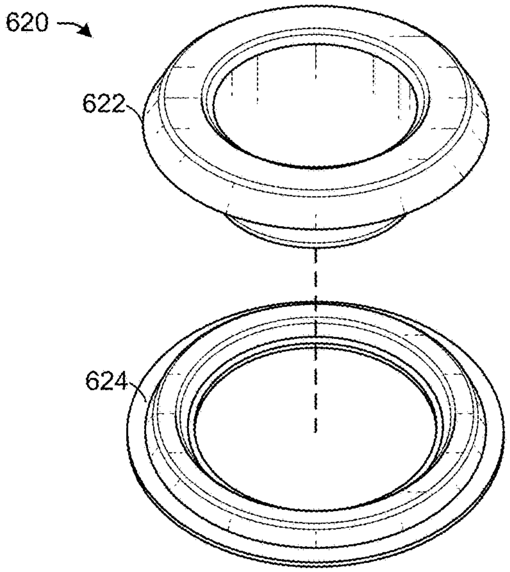

FIG. 6B shows an example component 620 for reinforcement of apertures for a carry handle 302 to be inserted into and through, in accordance with one or more embodiments of the present disclosure.

The component 620 may include a first portion 622 that fits into a second portion 624, each of which may fit into apertures 230 and 240, for example.

Figure 6C:
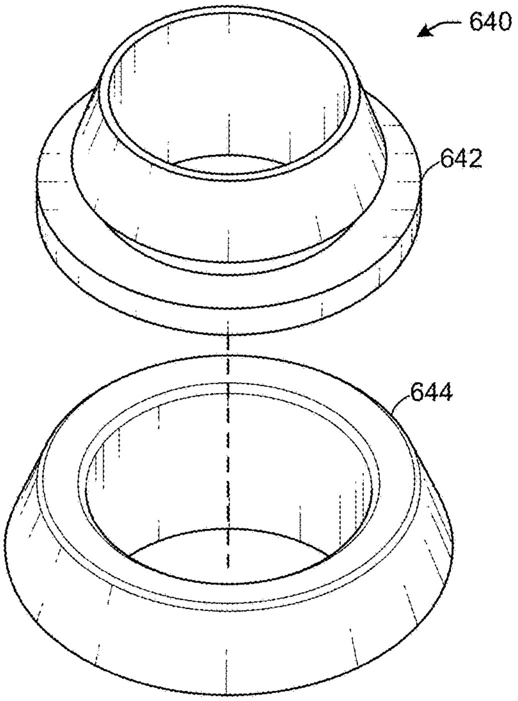

FIG. 6C shows an example component 640 for reinforcement of apertures for a carry handle 302 to be inserted into and through, in accordance with one or more embodiments of the present disclosure.

The component 640 may include a first portion 642 that fits into a second portion 644, each of which may fit into apertures 230 and 240, for example.

Figure 6D:
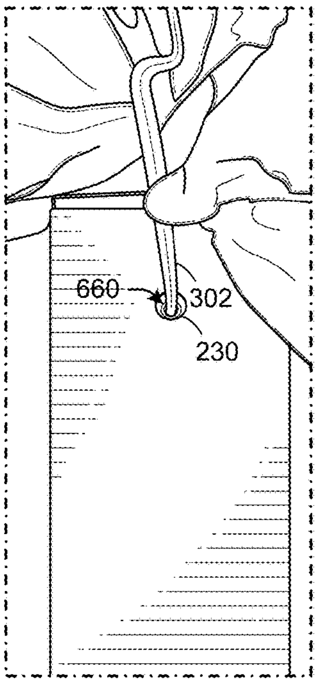
FIG. 6D shows an example component of which may reinforce one and/or pluralities of apertures on the single material, as shown in FIG. 3A, and a carry handle threaded through a side panel aperture having an example component, in accordance with one or more embodiments of the present disclosure.

FIG. 6D shows an example component 660 for connecting the carry handle 302 of FIG. 3A, in accordance with one or more embodiments of the present disclosure.

The component 660 may represent any of the components 600, 620, and 640, for example, and may fit through the aperture 230 as shown, and/or aperture 240.

Figure 7A:
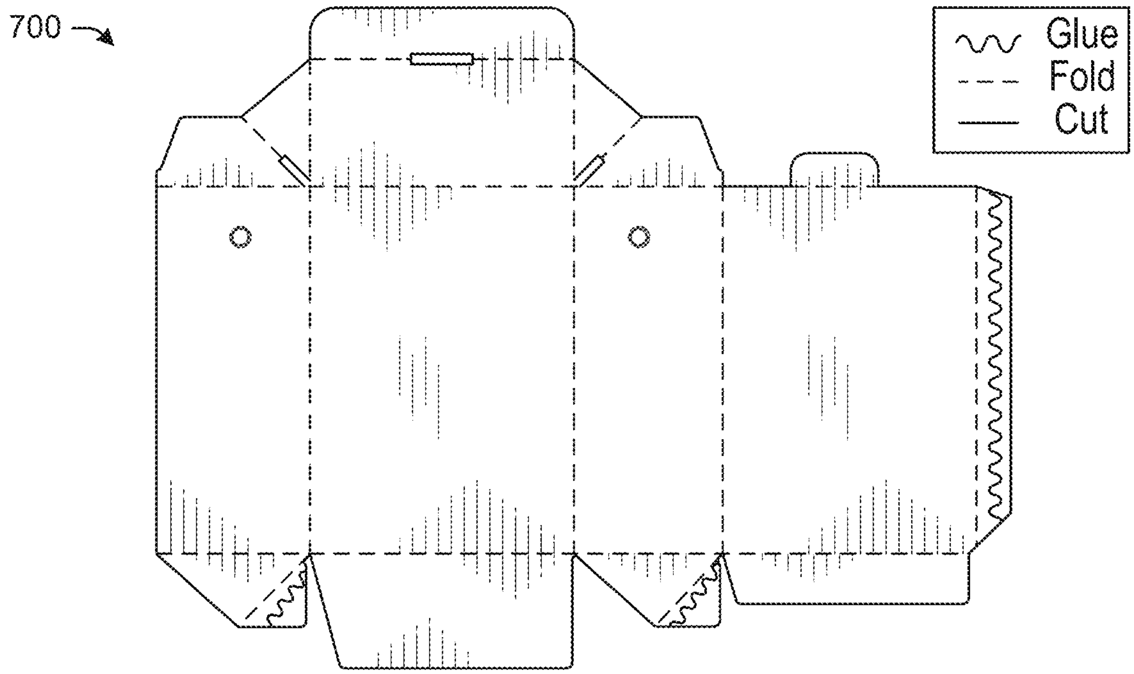
FIG. 7A shows an example single material blank in a flat, unfolded condition, in accordance with one or more example embodiments of the present disclosure.

FIG. 7A shows an example single material 700 blank in a flat, unfolded condition, in accordance with one or more example embodiments of the present disclosure.

In comparison with FIG. 1, the single material 700 represents an alternative design for creating an article-receiving receptacle.

Figure 7B:
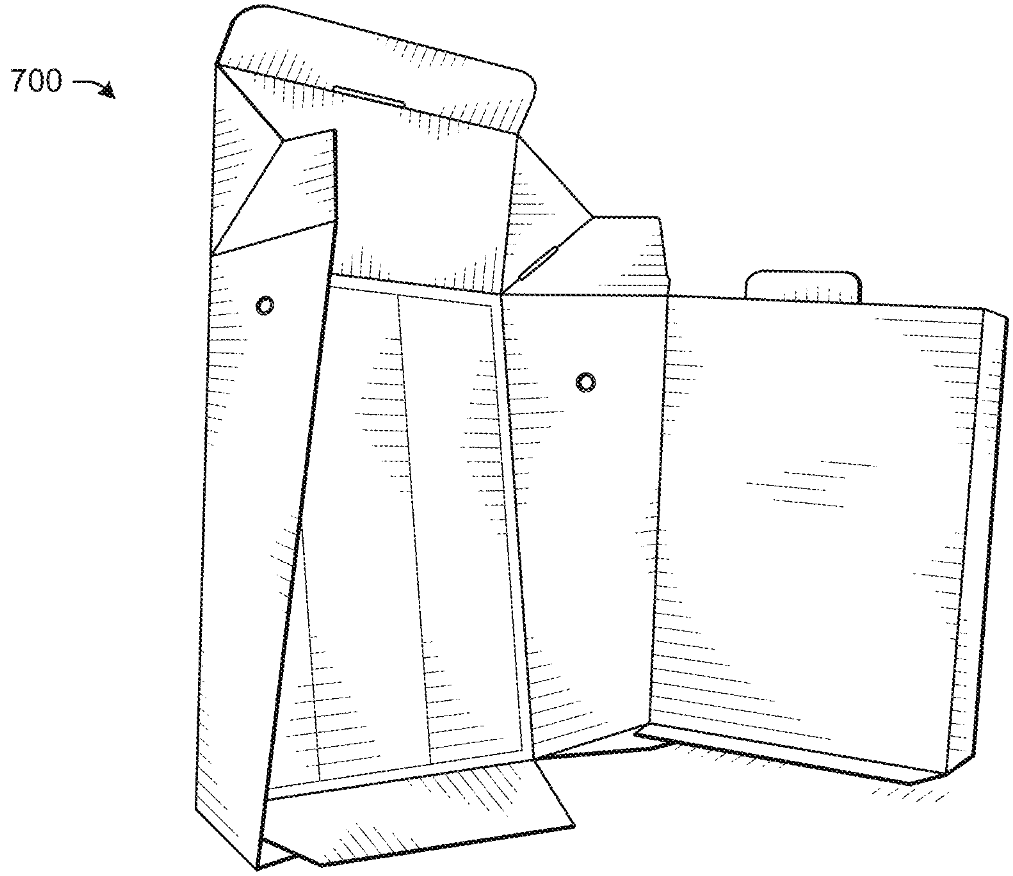
FIG. 7B shows the single material of FIG. 7A in a partially folded condition, in accordance with one or more example embodiments of the present disclosure.

FIG. 7B shows the single material 700 of FIG. 7A in a partially folded condition, in accordance with one or more example embodiments of the present disclosure.

Figure 7C:
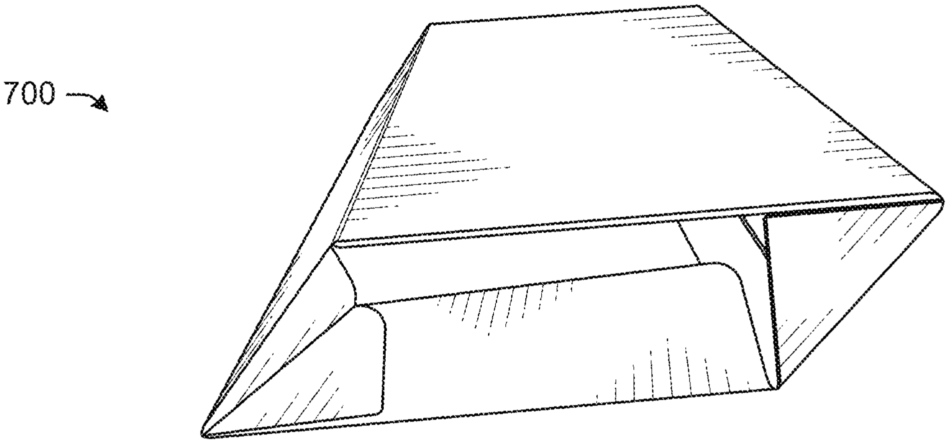
FIG. 7C shows the single material of FIG. 7B in a further folded condition, in accordance with one or more example embodiments of the present disclosure.

FIG. 7C shows the single material 700 of FIG. 7B in a further folded condition, in accordance with one or more example embodiments of the present disclosure.

Figure 7D:
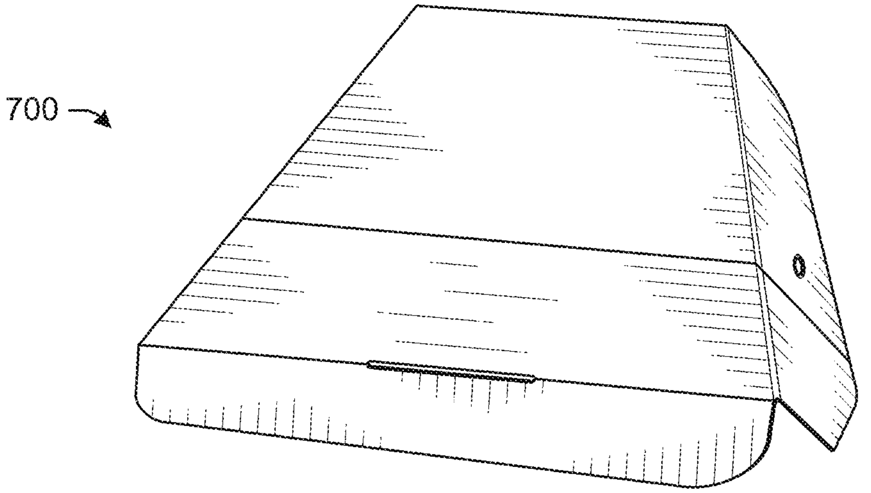
FIG. 7D shows the single material of FIG. 7C in a further folded condition, in accordance with one or more example embodiments of the present disclosure.

FIG. 7D shows the single material 700 of FIG. 7C in a further folded condition, in accordance with one or more example embodiments of the present disclosure.

Figure 7E:
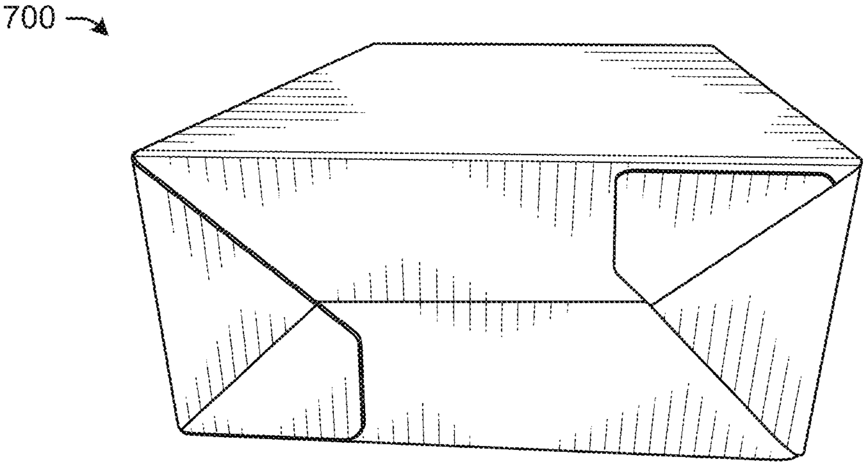
FIG. 7E shows the single material of FIG. 7D in a fully folded condition, in accordance with one or more example embodiments of the present disclosure.

FIG. 7E shows the single material 700 of FIG. 7D in a fully folded condition, in accordance with one or more example embodiments of the present disclosure.

Figure 8:
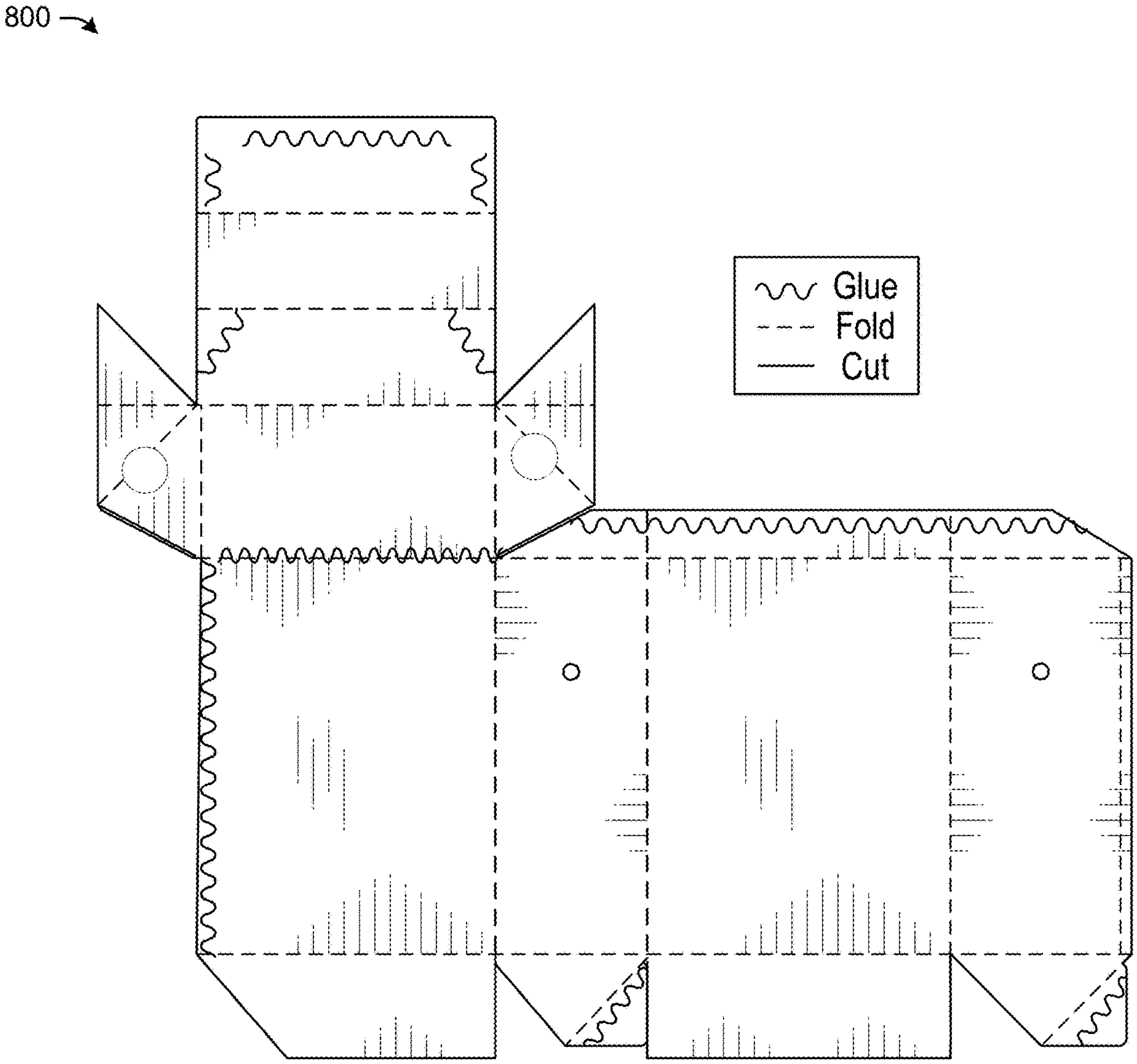
FIG. 8 shows an example single material blank in a flat, unfolded condition, in accordance with one or more example embodiments of the present disclosure.

FIG. 8 shows an example single material 800 blank in a flat, unfolded condition, in accordance with one or more example embodiments of the present disclosure.

In comparison with FIG. 1, the single material 800 represents an alternative design for creating an article-receiving receptacle.

In Use:

A user may select and purchase a disclosure (e.g., according to any of the designs shown in the FIGs.) from a retailer. A disclosure may be fully assembled or partially assembled. A user may remove the product from retail packaging and manipulate a disclosure from a flat, folded condition to an erect condition, and further manipulate and position an article receiving receptacle top portion to an open condition for insertion of one and/or pluralities of user-selected gift articles through the top portion openable closure. Articles may rest on the interior bottom region of which may be provided with a bottom buffering/cushioning insert material (e.g., within the receptacle 222). A user may then manipulate and position a receptacle top portion to a closed condition, enclosing the inserted article(s). In the instances of a disclosure not having pre-affixed embellishments and/or embellishment arrangements (by way of manufacturing), a user would prepare to manually affix said embellishments by locating the terminal end of said embellishments and/or embellishments arrangement and affix to a receptacle top portion and in accordance with placement indicators (the number of applied embellishments and/or embellishment arrangements may vary depending on dimensions and/or shape of a receptacle structure). Further, a user may access the expression card and manipulate the front panel in an upwardly type of way to expose the center panel aperture (window), of which in conjunction with the back panel, holds in place a slidably engaged sentiment card. A user would then locate and grasp the sentiment card pull-tab element and in this configuration, horizontally slide it away from the center panel aperture (window) until fully exited from the expression card. A user may utilize a writing device (of which may or may not be included with the disclosure) and add handwritten personalization to the sentiment card first side and/or second side, in accordance with the ruling, and then slidably re-engage the sentiment card into said expression card via the open edge region of the center panel in conjunction with the back panel, and downwardly manipulate the front panel second side, second edge to interface with the center panel first side, fourth edge, and into a closed position and of which may be met with interfacing closure materials, of which serve to maintain the expression card in a closed position, for example, by way of adhesive and/or other closure materials and/or components of which may be employed. An article receiving receptacle assembly may be configured to be reusable. Users may removably interchange embellishments and/or embellishment arrangements, including new sentiment cards.

As can be appreciated, various embodiments of the disclosure herein provide for an aesthetically appealing and enclosed and concealing article receiving receptacle assembly, for gift presentation. As certain changes may be made in the above disclosure without departing from the scope hereof, it is intended that all matter contained in the above description and/or shown in the accompanying drawings, be interpreted as illustrative and not limited. It is also to be understood that the following claims are to cover certain generic and specific features described herein. It is, of course, not possible to describe every conceivable combination of components and/or methodologies for purposes of describing the claimed subject matter, however, one of ordinary skill in the art may recognize that many further combinations are possible.

In one or more embodiments, a formed and erected receptacle 222, and said components, together form an exemplary integrated article receiving receptacle and embellishments assembly, of which decorative features purposefully coordinate together to achieve a visually appealing gift presentation.

Optionally, an embellishment arrangement terminal end region could have an affixed coupling end-component of which may be received by a top portion (and/or any panel of the disclosure) affixed coupling receiving component.

Optionally, any coupling components may be used as part of a decorative feature, and any 3-d components of which may protrude and/or extend from and/or through any one and/or pluralities of panels and/or flaps, and/or any said disclosure components.

Optionally, any decorative materials may adorn the disclosure in one and/or pluralities of various die-cuts of any suitable materials, paper materials, tissue papers, cardboard materials, ornaments, balloons, fabrics, toys, florals, three-dimensional shapes/materials, wooden materials, foam materials, jewelry, jewels, charms, beads, leather materials, flocked materials, glitter stems/stems, feathers, boas, wire-edge bows and/or ribbon strand materials, and in various shapes, and any of which may have text, characters, numerals, same sizes and/or graduated sizes, and single-faced materials, and/or double-faced materials, and one and/or pluralities of (not shown) writing device, and/or light emitting device, and/or sound emitting device, and/or movement emitting device, and/or scent application(s), however, not limited thereto. It is appreciated that one skilled in the art acknowledge, any of which may have one and/or pluralities of applied color(s), coatings, textures, designs, sizes, shapes, patterns, textures, range of flexibility and/or stiffness configurations. It is also appreciated and acknowledged, there are vast amounts of light-weight adornment options and configurations of such, and of which could be coupled with said embellishment arrangements, and without limitations thereto.

Embellishments may include a center core component of which may be elongated and varying in heights and/or lengths and/or widths and/or circumference, and may be made of flexible materials and/or non-flexible materials, of which may be encased and/or coated with secondary materials, and wherein may have a first end, and a second end, and a distal space in between said first end and second end, an inner wall and an outer wall, and of which may have a hollow condition and/or solid condition, and/or a partially hollow and/or partially solid condition. A center core component may be provided with one and/or pluralities of purposefully color and/or theme coordinated, light-weight embellishment materials, for example, paper, fabric, bows, ribbon strand materials, various wire-stemmed embellishments, balloons, tulle, mesh, net, mylar, and/or any suitable materials, of which may be of any single sided and/or double-sided material in any variety of colors and/or finishes (metallic, pearlized, matte, glossy, micro crystals, shimmery, holographic, debossed, embossed), and/or coupling components for conjoining onto a center core. Further, said embellishment materials may be of same sizes and/or graduated sizes, and may be organized in a layered, and upwardly and outwardly inclined manner. Embellishment materials may be affixed to a center core component and in limitless methods, for example, paper materials may be centered and pierced onto a center core first end and slid downward towards a center core second end; Various other embellishment components may each have their own independent stem/base having a first end and/or a second end, and/or a terminal end, in which case would be conjoined to a center core component by applying an adhesive and/or wrapping the embellishment stem terminal end, and center core together with an adhesive tape, and/or a suitable fastener component and/or fastener material. Further, a center core may have a bottom base support of which may be provided with a peel-away adhesive backing material, wherein a user may remove the said paper cover, exposing the adhesive and further affixing one and/or a plurality of embellishments, onto a disclosure surface and in accordance with placement indicators.

The embodiments described herein are not meant to be limiting.

The word “exemplary” is used herein to mean “serving as an example, instance, or illustration.” Any embodiment described herein as “exemplary” is not necessarily to be construed as preferred or advantageous over other embodiments.

As used herein, unless otherwise specified, the use of the ordinal adjectives “first,” “second,” “third,” etc., to describe a common object, merely indicates that different instances of like objects are being referred to and are not intended to imply that the objects so described must be in a given sequence, either temporally, spatially, in ranking, or in any other manner.

The foregoing description of one or more implementations provides illustration and description but is not intended to be exhaustive or to limit the scope of embodiments to the precise form disclosed. Modifications and variations are possible in light of the above teachings or may be acquired from practice of various embodiments.

The processes described and shown above may be carried out or performed in any suitable order as desired in various implementations. Additionally, in certain implementations, at least a portion of the processes may be carried out in parallel, creating a co-existence use case. Furthermore, in certain implementations, less than or more than the processes described may be performed.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims.

The invention claimed is:

1. An article-receiving receptacle comprising:

a single material that, when in a flat, unfolded condition, comprises:

a front panel parallel to a back panel;

a first lid portion adjacent to and parallel to the front panel;

a second lid portion adjacent to and parallel to the first lid portion;

a third lid portion adjacent to and parallel to the second lid portion;

a fourth lid portion adjacent to and parallel to the third lid portion;

at least one first side panel parallel to, and in between, the front panel and the back panel;

at least one second side panel parallel and adjacent to the front panel or the back panel;

at least one first bottom panel portion adjacent to the front panel;

at least one second bottom panel portion adjacent to the back panel and parallel to the at least one first bottom panel portion, wherein the single material is configurable to form a receptacle-receiving enclosure by:

folding along a first edge of the front panel and the at least one first side panel;

folding along a second edge of the back panel and the at least one first side panel;

folding along a third edge of the front panel and the at least one first bottom panel portion;

folding along a fourth edge of the back panel and the at least one second bottom panel portion;

folding along a fifth edge of the at least one second side panel and the front panel or the back panel;

attaching the at least one first side panel to the front panel or the back panel based on the folding along the fifth edge; and attaching the at least one first bottom panel portion to the at least one second bottom panel portion based on the folding along the third edge and the folding along the fourth edge;

folding along a sixth edge of the second lid portion and the third lid portion to overlap the second lid portion with the third lid portion and to overlap the fourth lid portion with the first lid portion;

adhering the second lid portion to the third lid portion;

adhering the first lid portion to the fourth lid portion;

folding along a seventh edge of the first lid portion and the front panel; and folding along an eighth edge of the third lid portion and the fourth lid portion, wherein adhering the second lid portion to the third lid portion, adhering the first lid portion to the fourth lid portion, folding along the seventh edge, and folding along the eighth edge form a top portion as a multi-layered lid, and wherein when the single material is folded to form the receptacle-receiving enclosure, the top portion is movable, based on the folding along the seventh edge, between an open position in which the receptacle-receiving enclosure is open and a closed position in which the receptacle-receiving enclosure is closed by the top portion.

2. The article-receiving receptacle of claim 1, wherein the top portion comprises at least one indicator configured to attach an embellishment and/or embellishment arrangement to the top portion.

3. The article-receiving receptacle of claim 1, wherein the at least one first side panel and the at least one second side panel comprise apertures configured to receive a carry handle material associated with lifting the article-receiving receptacle.

4. The article-receiving receptacle of claim 3, wherein the single material is configurable to form a receptacle-receiving enclosure by:

forming a first side top portion by folding along a ninth edge of the first lid portion and a second side top portion by folding along a tenth edge of the first lid portion, and wherein the first side top portion and the second side top portion comprise second apertures configured to receive the carry handle material.

5. The article-receiving receptacle of claim 4, wherein the first side top portion and the second side top portion of the top portion extend outward from and perpendicular to the first lid portion.

6. The article-receiving receptacle of claim 5, wherein the first side top portion and the second side top portion of the top portion are parallel to each other based on the folding along the ninth edge and the folding along the tenth edge.

7. The article-receiving receptacle of claim 5, wherein the first side top portion and the second side top portion of the top portion are perpendicular to the second lid portion and the third lid portion based on the folding along the ninth edge, the folding along the tenth edge, and a folding along an eleventh edge of the first lid portion and the second lid portion.

8. The article-receiving receptacle of claim 1, wherein the attaching the at least one second side panel to the front panel or the back panel and the attaching the at least one first bottom panel portion to the at least one second bottom panel portion are further based on an adhesive material used for the attaching.

9. The article-receiving receptacle of claim 1, further comprising an expression card attached to the front panel.

10. The article-receiving receptacle of claim 9, further comprising an expression card center panel aperture portion configured to receive a sentiment card, wherein the expression card is attached to at least one of the front panel or the multi-layered lid, and wherein the sentiment card is slidably removable and separate from the expression card.

11. The article-receiving receptacle of claim 1, further comprising an embellishment and/or embellishment arrangement comprising a support base, a flexible and/or non-flexible center core material attached to the support base, at least one flat subcomponent attached to the flexible and/or non-flexible center core material, and decorations attached to the at least one flat subcomponent.

12. A gift packaging receptacle comprising:

a single material that, when in a flat, unfolded condition, comprises:

a front panel parallel to a rear panel;

a first lid portion adjacent to and parallel to the front panel;

a second lid portion adjacent to and parallel to the first lid portion;

a third lid portion adjacent to and parallel to the second lid portion;

a fourth lid portion adjacent to and parallel to the third lid portion;

at least one first side panel parallel to, and in between, the front panel and the rear panel;

at least one second side panel parallel and adjacent to the front panel or the rear panel;

at least one first bottom panel portion adjacent to the front panel; and at least one second bottom panel portion adjacent to the rear panel and parallel to the at least one first bottom panel portion, wherein the single material is configurable to form a receptacle-receiving enclosure by:

folding along a first edge of the front panel and the at least one first side panel;

folding along a second edge of the rear panel and the at least one first side panel;

folding along a third edge of the front panel and the at least one first bottom panel portion;

folding along a fourth edge of the rear panel and the at least one second bottom panel portion;

folding along a fifth edge of the at least one second side panel and the front panel or the rear panel;

attaching, using an adhesive, the at least one second side panel to the front panel or the rear panel based on the folding along the fifth edge; and attaching, using the adhesive, the at least one first bottom panel portion to the at least one second bottom panel portion based on the folding along the third edge and the folding along the fourth edge;

folding along a sixth edge of the second lid portion and the third lid portion to overlap the second lid portion with the third lid portion and to overlap the fourth lid portion with the first lid portion;

adhering the second lid portion to the third lid portion;

adhering the first lid portion to the fourth lid portion;

folding along a seventh edge of the first lid portion and the front panel; and folding along an eighth edge of the third lid portion and the fourth lid portion, wherein adhering the second lid portion to the third lid portion, adhering the first lid portion to the fourth lid portion, folding along the seventh edge, and folding along the eighth edge form a multi-layered lid, and wherein when the single material is folded to form the receptacle-receiving enclosure, the multi-layered lid is movable, based on the folding along the seventh edge, between an open position in which the receptacle-receiving enclosure is open and a closed position in which the receptacle-receiving enclosure is closed by the multi-layered lid.

13. The gift packaging receptacle of claim 12, wherein the at least one first side panel and the at least one second side panel comprise apertures configured to receive a handle material associated with lifting the gift packaging receptacle.

14. The gift packaging receptacle of claim 13, wherein the single material is configurable to form a receptacle-receiving enclosure by:

forming a first side lid portion by folding along a ninth edge of the first lid portion and a second side lid portion by folding along a tenth edge of the first lid portion, and wherein the first side lid portion and the second side lid portion comprise second apertures configured to receive the handle material.

15. The gift packaging receptacle of claim 12, further comprising a sentiment card attached to the front panel or the multi-layered lid.

16. The gift packaging receptacle of claim 15, further comprising a frame portion configured to receive the sentiment card, wherein an expression card is attached to at least one of the front panel or the multi-layered lid.

17. The gift packaging receptacle of claim 12, further comprising an embellishment comprising a support base, a flexible or non-flexible center core material attached to the support base, at least one flat component attached to the flexible center core material, and decorations attached to the at least one flat component.

18. A method of forming an article-receiving receptacle using a single material, the method comprising:

folding along a first edge of a front panel of the single material and at least one first side panel of the single material, the single material comprising a first lid portion adjacent to and parallel to the front panel, a second lid portion adjacent to and parallel to the first lid portion, a third lid portion adjacent to and parallel to the second lid portion, and a fourth lid portion adjacent to and parallel to the third lid portion;

folding along a second edge of a back panel of the single material and the at least one first side panel;

folding along a third edge of the front panel and at least one first bottom panel portion of the single material;

folding along a fourth edge of a back panel of the single material and at least one second bottom panel portion of the single material;

folding along a fifth edge of at least one second side panel of the single material and the front panel or the back panel;

attaching the at least one second side panel to the front panel or the back panel based on the folding along the fifth edge; and attaching the at least one first bottom panel portion to the at least one second bottom panel portion based on the folding along the third edge and the folding along the fourth edge;

folding along a sixth edge of the second lid portion and the third lid portion to overlap the second lid portion with the third lid portion and to overlap the fourth lid portion with the first lid portion;

adhering the second lid portion to the third lid portion;

adhering the first lid portion to the fourth lid portion;

folding along a seventh edge of the first lid portion and the front panel; and folding along an eighth edge of the third lid portion and the fourth lid portion, wherein adhering the second lid portion to the third lid portion, adhering the first lid portion to the fourth lid portion, folding along the seventh edge, and folding along the eighth edge form a top portion as a multi-layered lid, and wherein when the single material is folded to form an article-receiving enclosure, the top portion is movable, based on the folding along the seventh edge, between an open position in which the article-receiving enclosure is open and a closed position in which the article-receiving enclosure is closed by the top portion.

19. The method of claim 18, wherein when the single material is in a flat, unfolded condition, the front panel is parallel to the back panel, the at least one first side panel is parallel to, and in between, the front panel and the back panel, the at least one second side panel is parallel and adjacent to the front panel or the back panel, and the top portion is adjacent to and parallel to the front panel.

20. The method of claim 18, further comprising:

attaching an expression card to the front panel;

attaching a decorative embellishment and/or embellishment arrangement to the single material; and attaching a carry handle to the single material via first apertures in the at least one first side panel and the at least one second side panel and via second apertures in a first side top portion of the top portion and a second side top portion of the top portion.

* * * * *